United States Patent [19]
Finney

[11] Patent Number: 5,836,738
[45] Date of Patent: *Nov. 17, 1998

[54] ADVANCED SUPERVENTURI POWER SOURCE

[76] Inventor: Clifton D. Finney, 1057 Oak Hills Pkwy., Baton Rouge, La. 70810

[*] Notice: The term of this patent shall not extend beyond the expiration date of Pat. No. 5,464,320.

[21] Appl. No.: 239,029

[22] Filed: May 6, 1994

Related U.S. Application Data

[63] Continuation-in-part of Ser. No. 219,192, Mar. 28, 1994, Pat. No. 5,464,320, which is a continuation-in-part of Ser. No. 74,023, Jun. 2, 1993, abandoned.

[51] Int. Cl.$^6$ ................................. F03D 1/02; F03D 1/04
[52] U.S. Cl. .............................. 415/60; 415/4.3; 415/4.5; 415/220
[58] Field of Search .............................. 415/2.1, 3.1, 4.1, 415/4.3, 4.5, 905, 906, 908, 60, 219.1, 220, 221

[56] References Cited

U.S. PATENT DOCUMENTS

| | | |
|---|---|---|
| 381,373 | 4/1888 | Hershel . |
| 1,345,022 | 6/1920 | Oliver . |
| 1,783,669 | 12/1930 | Oliver . |
| 2,330,907 | 10/1943 | Odor et al. ................................. 415/4.3 |
| 4,070,131 | 1/1978 | Yen . |
| 4,166,596 | 9/1979 | Mouton, Jr. et al. ..................... 415/2.1 |
| 4,320,304 | 3/1982 | Karlsson et al. . |

FOREIGN PATENT DOCUMENTS

| | | | |
|---|---|---|---|
| 26223 | 4/1923 | France ..................................... 415/4.5 |
| 866053 | 6/1941 | France ..................................... 415/2.1 |
| 891697 | 3/1944 | France . | |
| 2518405 | 11/1976 | Germany ................................. 415/2.1 |
| 527585 | 1/1955 | Italy ........................................ 415/4.3 |

OTHER PUBLICATIONS

W. H. Rae and A. Pope, "Low–Speed Wind Tunnel Testing", $2^{nd}$ ed. (John Wiley, NY, 1984) pp. 5–36.

R. E. Sprenkle on *Venturi Tube* in "McGraw–Hill Encyclopedia of Science and Technology," (NY, 1987) vol. 19, pp. 188–189.

F.G. Bailey on *Turbine* in "McGraw–Hill Encyclopedia of Science and Technology," (New York, 1992) vol. 18, p. 618.

O. Igra, *Proceedings of the Second Workshop on Wind Energy Systems,* (NTIS N78–76989, Washington, D.C., 1975) pp. 149–155.

R. Smith and C. Wang, *Journal of the Aeronatical Sciences,* vol. 11, 1944, pp. 356–360.

*Primary Examiner*—Edward K. Look

[57] ABSTRACT

One manifestation of an advanced superventuri power source comprises: (i) a series of at least three venturi tubes with at least one threesome of the tubes labeled an alpha-, beta-, and gamma-venturi tube respectively, and of predetermined successively increasing flow capacity respectively; (ii) the alpha- and beta-venturi tubes each having an open entrance to permit flow through the respective open entrance and out of the respective open exit; (iii) respective inlets of the threesome each facing the intended direction of flow; (iv) the open exits of the alpha- and beta-venturi tubes placed adjacent the throats of the beta- and gamma-venturi tubes, respectively, so that respective central axes of the threesome essentially merge into a central super-axis along an intended line of flow; (v) as referenced from the super-axis, the inlets of the alpha-, beta-, and gamma-venturi tubes being positioned to intercept relatively inner, intermediate, and outer portions of the selected medium as an alpha-, beta-, and gamma-flow, respectively, whereby in operation the alpha-flow as exhaust from the open exit of the alpha-venturi tube joins accelerated beta-flow adjacent the throat of the beta-venturi tube and the beta-flow as exhaust from the open exit of the beta-venturi tube, in turn, joins accelerated gamma-flow adjacent the throat of gamma-venturi tube; and (vi) a beta-turbine adjacent the throat of the beta-venturi tube to recover useful rotary mechanical power.

12 Claims, 5 Drawing Sheets

ADVANCED SUPERVENTURI POWER SOURCE

BACKGROUND—CROSS-REFERENCE TO RELATED APPLICATION

The present work is a continuation-in-part application of the parent entitled a "Superventuri Power Source," filed Mar. 28, 1994 as application Ser. No. 08/219,192 now U.S. Pat. No. 5,464,320, granted Nov. 7, 1995 which is a continuation-in-part of Ser. No. 08/074,023, filed Jun. 2, 1993, abandoned.

BACKGROUND—FIELD OF INVENTION

This invention relates to enhanced power recovery from the flow of a selected medium employing a superventuri power source comprising either a series of at least two venturi tubes or a series of at least three venturi tubes as an accelerator with a turbine adjacent the throat of at least the second or beta-venturi tube in such series.

BACKGROUND—THEORETICAL DEVELOPMENT

THE VENTURI ALGORITHM. The ultimate power sought herein is similar to that at the ground tip of a tornado or hurricane in nature. A corresponding quest is the search for a more perfect turbine to efficiently tap that power at least to the extent of closely approaching the Betz limit.

In the parent application a venturi tube was thought of as a possible vehicle to that power because it acts like an amplifier whose ideal behavior is described kinematically by the continuity equation and energetically by the Bernoulli equation. From consideration of mass balance, the continuity equation requires that the velocity of a tube of flowing medium entering a venturi tube steadily increase from its entrance velocity u at the contracting inlet to a maximum throat velocity equal to product of contraction ratio and its entrance velocity u. However, as the tube of flowing medium passes from the throat into an expanding outlet its velocity steadily decreases from its maximum throat velocity to a minimum exit velocity which again equals the entrance velocity u in an ideal case.

When these results on the velocity of a flowing medium are considered in the context of the Bernoulli equation, the following Venturi algorithm on energetics emerges. As the tube of flowing medium passes through the contracting inlet its kinetic energy of flow increases while its pressure-volume internal energy decreases a corresponding amount. In the throat the kinetic energy of flow is a maximum while the pressure-volume internal energy is a corresponding minimum. As the tube of flowing medium passes into the expanding outlet its kinetic energy of flow decreases while its pressure-volume internal energy increases a corresponding amount until, at the exit, all parameters equal their respective initial values at the entrance of the venturi tube.

THE BETZ ALGORITHM. In 1927, A. Betz of the Institute of Göttingen published the result that a maximum of 59.3% of the available flow power in a tube of wind intercepted by an unenshrouded ideal turbine could be extracted to perform useful work. This limit, which still has firm standing, was imposed through the application of simple momentum theory and assumes that a wind exhibits perfect mechanical characteristics.

We digress to note, however, that this classical mechanical approach is narrow in scope compared to the broader range of classical thermodynamic possibilities. It is important to draw this distinction because it is well known that certain natural phenomena such as hurricanes draw a portion of their energy from latent heat of condensation as warm, moist air yields rainfall. Thus, the Betz limit truly is a limit for some cases such as dry air, but it is also not necessarily a limit for every case, and particularly where a phase a change such as condensation is involved.

Returning to the basic argument, Betz found that the physical presence of a wind turbine caused the velocity of a tube of wind approaching it to steadily decrease. The velocity declines from its initial maximum velocity u a considerable distance upstream of the turbine to $\frac{2}{3}$ u in the immediate region of the turbine to a final minimum velocity of $\frac{1}{3}$ u a considerable distance downstream of the turbine. After the tube of wind descends to its minimum velocity of $\frac{1}{3}$ u downstream it once again gradually ascends to its initial maximum velocity u via mixing with the ambient wind.

The normal cross-sectional area of the tube of wind that passes through the turbine is inversely proportional to its velocity. Hence, if the circular cross-sectional area defined by the rotating turbine is A, then a considerable distance upstream of the turbine where the initial velocity is u, the normal cross-sectional area of the tube of wind which ultimately passes through the turbine is only $\frac{2}{3}$ A. Too, a considerable distance downstream of the turbine when the final minimum velocity is $\frac{1}{3}$ u, then the normal cross-sectional area of this tube is 2A. The maximum power transferred is just the difference between the maximal power upstream $\frac{1}{2}\rho(\frac{2}{3}A)u^3$ and the minimal power downstream $\frac{1}{2}\rho(2A)(\frac{1}{3}u)^3$ yielding $\frac{1}{2}\rho(\frac{16}{27})Au^3$. The factor $\frac{16}{27}$ which is 0.593 is the Betz coefficient.

When the preceding results on the velocity of a tube of wind are considered in the context of the Bernoulli equation, the following Betz algorithm on energetics of a turbine emerges. As the tube of wind approaches the turbine its kinetic energy of flow decreases while its pressure-volume internal energy increases a corresponding amount. Immediately in front of the turbine the pressure of the tube attains its maximal value which is above atmospheric pressure. At the turbine, kinetic energy is transferred from the tube to the blades as an increment of work $\Delta w$, but this is immediately replaced by a corresponding transfer of pressure-volume internal energy to kinetic energy of flow. Accordingly, in the region immediately behind the turbine, the pressure of the tube attains its minimum value which is below atmospheric pressure.

As the tube of wind recedes from the turbine its kinetic energy of flow continues to decrease while the pressure-volume internal energy increases a corresponding amount until the pressure of the tube attains atmospheric pressure. Hence in the Betz algorithm, since the internal pressure-volume energy returns to its original value, the work extracted $\Delta w$ comes entirely from kinetic energy of flow.

THE BETZ-VENTURI CONFLICT. Let us now place a turbine in the throat of a venturi tube as illustrated in FIG. 4B of the parent and compare the Betz and Venturi algorithms on energetics. The positions upstream from the turbine, at the turbine, and downstream from the turbine in the Betz algorithm are assumed to correspond approximately to respective positions in the contracting inlet, throat, and expanding outlet in the Venturi algorithm.

Thus, in the contracting inlet the Betz algorithm has kinetic energy decreasing and pressure-volume internal energy increasing. Conversely, the Venturi algorithm has kinetic energy increasing and pressure-volume internal energy decreasing. This apparent opposition is in fact a Betz-Venturi rapport at the inlet because the turbine is tending to expand streamlines and thereby dilute power while the venturi tube is tending to compress streamlines and thereby concentrate power. Accordingly, in this position the venturi tube has a positive effect in promoting power conversion at the turbine.

Assuming a reasonably short throat, the Betz algorithm in this position has kinetic energy approximately constant. The increment of kinetic energy which is transferred as work $\Delta w$ from the medium to the turbine is immediately replenished from a deep well of internal pressure-volume energy. Too, the Venturi algorithm has both kinetic and internal pressure-volume internal energy constant. Hence we have essentially a holding pattern of streamlines at the throat. Presumably, the existence of the Betz-Venturi rapport in the inlet might still dominate.

In the expanding outlet the Betz algorithm has kinetic energy decreasing and pressure-volume internal energy increasing. Likewise, the Venturi algorithm also has kinetic energy decreasing and pressure-volume internal energy increasing. This apparent agreement is in fact a Betz-Venturi conflict at the outlet because the turbine and the venturi tube are simultaneously expanding streamlines in the diffuser. Since at best the diffuser will only marginally serve the requirements of the Venturi algorithm, the additional requirement which the Betz algorithm imposes to expand streamlines in this region will presumable cause turbulence and a slowing of flow through the venturi tube. Accordingly, in this position the venturi tube has a negative effect in promoting power conversion at the turbine.

Thus there are two clear reasons why singular venturi tubes fail as shrouds for turbines. The first reason, examined in some detail in the parent, has to do with the fact that as the contraction ratio of a venturi tube increases its efficiency in attaining ideal throat velocities declines due to the real effects of drag, turbulence, and viscosity in the selected medium. The second reason, newly delineated herein above, has to do with fact that the presence of a turbine in the throat of a venturi tube causes a Betz-Venturi conflict in the outlet of the venturi tube in the form of presumably radical, and thereby turbulent, expansion of streamlines.

The fact that in FIGS. 1D–1E, FIG. 4C, and FIG. 4E of the parent turbines were used to measure throat velocity and power should not be a source of ambiguity in interpreting those results with reference to efficiency of venturi tubes or the Betz-Venturi conflict. That the results in the parent relate primarily to the efficiency of the tubes has been confirmed by essentially reproducing representative data of the parent in experiments where measurements were performed with Pitot tubes as opposed to turbines serving as anemometers. Thus, the effect of the Betz-Venturi conflict could only have appeared as a minor perturbation in those experiments because the power drawn by any turbine was at most under five percent of that available as was reported.

BACKGROUND—PARENT APPLICATION

The thrust of the parent was to promote greater power output by exploring the notion of a superventuri power source having a turbine adjacent the throat of at least one venturi tube in a stage subsequent to the first. Thus, in a superventuri power source having at least two stages, the second-stage venturi tube exhibits the dual action of pumping on the first-stage venturi tube and producing power via the turbine. Such a combination of actions would tend to promote efficiency because any single action when taken alone has an inherent associated inefficiency. Accordingly, for example, power lost to turbine inefficiency in the second-stage could still be used to pump on the first-stage.

The experimental surprise in the prior work was the discovery that the performance of the second-stage turbine improved when the radial length of a blade was substantially less than the minimal distance between the central superaxis of the superventuri apparatus and the closest limit of the throat of the second-stage venturi tube. More specifically, the second-stage turbine had an abbreviated impulse blade with a blade length approximating the difference between the radius of the throat of the second-stage venturi tube and the radius of the open exit of the first-stage venturi tube. This fact also had economic appeal because the cost of turbines is strongly related to blade radii, and in a superventuri power source no blade need have a radius approaching the largest radius of the apparatus.

The experimental performance of the superventuri power source illustrated in FIGS. 1A–1C of the parent demonstrated the correct ordering of velocities at the throats of the first and second stages, respectively, as predicted by EQN. 3 and EQN. 7 and as represented in FIG. 1D. The maximum velocity attained in a first-stage venturi tube was 2.55-times the entrance velocity of the tunnel wind and the best power amplification factor for the two-stage system via EQN. 8 was 1.87.

Accordingly, superventuri power sources are felt to offer promise in three directions. Firstly, they offer inherently superior performance over unenshrouded turbines at low wind speeds because they are flow accelerators, where, in the lowest stage particularly, throat velocities of 2- to 3-times entrance have already been achieved. This means that the performance of superventuri power sources should surpass anything else in the prior art at low wind speeds.

Secondly, superventuri power sources offer the promise of perhaps becoming the most efficient turbines, wind or otherwise, so far devised. This cause can be argued by considering factors such as the Betz limit, power amplification, and multiple action at a throat such as pumping and power production. At the outset it is important to recognize that a Betz limit does apply for superventuri power sources in the macroscopic sense. In other words, for a dry wind, there is a macroscopic upper limit of extraction based upon largest normal cross-section of the apparatus.

However, the existence of power amplification through the superventuri apparatus holds the promise of making an extraction of power nearer any such macroscopic upper limit possible. For example, suppose there is a superventuri apparatus as illustrated herein whose power amplification factor is two. Furthermore, suppose this superventuri apparatus is converted to a superventuri power source whose turbines are each able to extract 25 percent of the power they intercept. It would appear feasible to attempt to multiply the power amplification of two by the extraction efficiency of 25% to arrive at an actual extraction efficiency of 50%. In this manner it is feasible to artificially enhance the efficiency of state-of-the-art turbines through the phenomenon of power amplification in the superventuri apparatus.

Too, it is important to recognize that the stipulation of a macroscopic upper limit applies only in average macroscopic behavior. In a superventuri power source, the power not efficiently extracted in an upper stage may presumably be used to pump on the exhaust of a lower stage and so on. The net result of this would be a greatly exaggerated power density in the lower stages and most particularly at the throat of the first-stage venturi tube.

Because of this, it is easy to see that in microscopic behavior, and most particularly in a first-stage venturi tube, that any macroscopic upper limit of extraction would not be evenly distributed over the superventuri power source. That is, the extraction limit on a lower stage venturi tube is determined primarily by the number of stages of pumping on it.

Accordingly, in a superventuri power source something above a fair geometric share of any macroscopic upper limit might be attained in the lower stages as a result of pumping by upper stages. Conversely, something below a fair geometric share of any macroscopic upper limit might be attained in the upper stages due to inefficient power extraction. On balance, if drag and other minor losses do not become too serious a problem, it will prove feasible to actually extract power very near the level of the macroscopic upper limit which is the Betz limit.

Thirdly, in addition to the promises of elevated productivity at low wind speeds and of higher efficiency of power extraction, superventuri power sources continue to offer the promise of enhanced cost effectiveness. Indeed, as has been suggested, a major aspect of this consideration is the economy of producing shorter turbine blades. However, the superventuri apparatus itself, being similar to an airplane fuselage in the case of wind, is also well within the scope of industry to engineer and produce cost effectively. Materials of choice for their construction include aircraft grade aluminum or epoxy reinforced graphite or various plastics—none being very costly nor exotic.

BACKGROUND—DESCRIPTION OF PRIOR ART

In a superventuri apparatus the exit of a lower-stage venturi tube such as illustrated in FIG. 4B of the parent is positioned adjacent the throat of a larger capacity upper-stage venturi tube as shown in FIG. 4D of the parent. When either or both of these stages have a turbine adjacent its throat, the apparatus becomes a power source as demonstrated by the turbine the first-stage venturi tube in FIG. 4D.

A positive effect of pumping on a lower stage by an upper stage can be viewed as the enhancement of the effective efficiency factor of the lower stage. Alternatively, the effects of turbulence and viscosity in the flow stream of the selected medium in the lower stage can be partially eliminated via pumping from the upper stage. In this manner a throat velocity more closely approximating that which would be predicted from the continuity equation as the simple product of contraction ratio and entrance velocity can be attained for the lower stage.

There has been some experimental indication that such an increased velocity in the lower stage may cause increased drag so that perfectly ideal behavior in the lower stage may remain elusive even as significant improvement is feasible. However, this coupling effect might be reduced through improved aerodynamic design and through the reduction of velocity via extraction of power by the various turbines.

The act of positioning the exit of the lower-stage venturi tube adjacent the throat of an upper-stage venturi tube can also be viewed as a major step toward resolving the Betz-Venturi conflict in the expanding outlet of the lower-stage venturi tube. Recall that this conflict had to do with simultaneous decreases in kinetic energy and increases in pressure-volume internal energy in both algorithms at the outlet of a venturi tube.

Now, however, the conflict tends to be ameliorated by the heightened kinetic energy and the diminished pressure-volume internal energy of the flowing medium in the throat of the upper stage. In other words the faster moving, lower pressure medium at the throat of the upper stage pumps on the otherwise slower moving, higher pressure exhaust from the exit of the lower stage. This pumping action in turn causes the desirable compression of streamlines in the expanding outlet of the lower stage.

A rudimentary superventuri power source was described by Jourdain in French Patent 26,223 dated Apr. 24, 1923. The device had standard turbines positioned closely adjacent the throats of the second- and third-stage venturi tubes. However, the open exit of the first-stage venturi tube was placed only loosely adjacent the throat of the second-stage venturi tube, and the open exit of the second-stage venturi tube was also placed only loosely adjacent the throat of the third-stage venturi tube. The ramification is that neither pumping nor power production were optimal in either the first- and second-stage venturi tubes.

This conclusion follows directly from EQN. 7 of the parent and EQN. 7C herein which establish a predicted multiplicative effect of pumping by an upper stage and upper stages, respectively, on the velocity at the throat of a lower stage. In these equations the throat velocity for a lower stage is seen to be directly proportional to its own maximal contraction ratio times the maximal contraction ratio of each upper stage. Here, a maximal contraction ratio for a venturi tube is the maximal normal cross-sectional area of the inlet divided by the minimal normal cross-sectional area of the throat. However, the use of the maximal contraction ratio for each upper stage is correct only when the open exit of a lower stage is placed in or closely adjacent to the throat of the upper stage.

More particularly, it is seen in FIG. 1 of France 26,223 that the maximal normal cross-sectional areas of the open exits of the first- and second-stage venturi tubes were greater, respectively, than the minimal normal cross-sectional areas of the throats of the second- and third-stage venturi tubes. This meant that the open exits of the first- and second-stage venturi tubes were necessarily positioned in the inlets, as opposed to the throats, of the second- and third-stage venturi tubes, respectively. In general, the positional contraction ratio at any point in a selected venturi tube may be defined as the ratio between the maximal normal cross-sectional area of the inlet and the normal cross-sectional area at another point in the venturi constriction of the selected tube. The other point may be in the inlet or the outlet of the venturi constriction.

Accordingly, in France 26,223 the positional contraction ratio in the inlet of the second-stage venturi tube at the point at which the open exit of the first-stage venturi tube was placed was only about seventy-five to eighty percent of the maximal contraction ratio at the throat of the second-stage venturi tube. Similarly, the positional contraction ratio in the inlet of the third-stage venturi tube at the point at which the open exit of the second-stage venturi tube was placed was also only about seventy-five to eighty percent of the maximal contraction ratio at the throat of the third-stage venturi tube. Thus, it is these lesser positional contraction ratios which would have to be substituted into EQN. 7C herein to arrive at a less than optimal velocity at the throat of the first-stage venturi tube. It also follows that the velocity at the throat of the second-stage venturi tube in France 26,223 was less than optimal.

Three later versions of superventuri power sources including Lavergne in French Patent 866,053 dated Jun. 6, 1941, Bloch in French Patent 891,697 dated Mar. 15, 1944, and Mouton and Thompson in U.S. Patent dated Sep. 4, 1979 all teach away from turbines of any type in a stage subsequent to the first. Lavergne in France 866,053, with a configuration similar to that in France 26,223, also had the open exit of the first-stage venturi tube in the inlet of the second-stage venturi tube with the generator from the first-stage turbine squarely in the throat of the second-stage venturi tube. Too, the positional contraction ratio in the inlet of the second-stage venturi tube at the point at which the open exit of the first-stage venturi tube was placed was only about fifty percent of the maximal contraction ratio at the throat of the second-stage venturi tube.

Bloch in France 891,697 did have the open exit of each lower stage correctly positioned closely adjacent the throat of each next upper stage. However, the clear object of the upper stage venturi tubes was to tightly focus pumping at the throat of the first-stage venturi tube to gain a considerable reduction in dimension of the turbine blades in the throat of the first-stage venturi tube. In other words Bloch specifically taught trading the increased diameter and complexity of a superventuri apparatus comprising three upper stages for focussed pumping on a turbine having proportionally reduced diameter in the throat of the lowest stage venturi tube.

Similarly, Mouton and Thompson in U.S. Pat. No. 4,166,596 also had the open exit of their first-stage venturi tube correctly placed closely adjacent the throat of their second-stage venturi tube. Particularly striking in FIG. 3 of U.S. Pat. No. 4,166,596 was the employment of twin turbines adjacent the throat of the first-stage venturi tube. The reduced weight of the proportionally smaller turbine blades and the buoyancy provided by the large diameter superventuri apparatus were also key components in this lighter-than-air power source.

POINT OF INVENTION

The continuing thrust of the current application is, to be viable, a superventuri power source must have a turbine adjacent the throat of at least one venturi tube in a designated stage subsequent to the first. Now, however, it is of interest to explore reasonable limits for simultaneously positioning the open exit of the next lower stage and the turbine adjacent the throat of the designated stage. More particularly, the twin requirements of optimal pumping and power recovery indicate that both the open exit of the next lower stage and the turbine be positioned closely adjacent the throat of the designated stage. One way to achieve this objective is to have the minimal normal cross-sectional area of the throat of the designated stage greater than the maximal normal cross-sectional area of the open exit of the next lower stage.

Too, it is of interest to advance the discussion to include more advanced super-venturi power sources having at least three stages wherein a specified stage between the first and last may exhibit a triple action. Firstly, the specified stage pumps on the exhaust of the next lower stage. Secondly, the exhaust of the specified stage is, in turned, pumped upon by the next upper stage. Thirdly, the specified stage may have a turbine adjacent its throat to convert available flow power to more useful rotary mechanical power. Once again, since any single action such as pumping or power conversion, when taken alone, tends to proceed at an efficiency of less than unity, a combination of actions tends to enhance efficiency. That is, more power is available in the specified stage because it is pumped on by the next upper stage, and any power lost to inefficiency of the turbine in the specified stage is still available for pumping on the next lower stage.

In such advanced superventuri power sources having at least three stages wherein the specified stage exhibits a triple action, it is also of interest to have a configuration where a turbine is absent adjacent the throat of the next upper stage following the specified stage. This configuration helps to avoid the negative theoretical surprise of the current work: namely, a Betz-Venturi conflict in the outlet of the next upper stage.

Once again, the experimental surprise presented in the parent application may also be applied to any turbine adjacent the throat of a designated or specified stage. Here, power recovery in the throat of a designated or specified stage improved when the radial length of an impulse blade was substantially less than the distance between the central superaxis of the superventuri apparatus and the closest limit of the throat of the designated or specified stage.

OBJECTS AND ADVANTAGES

Accordingly, the several objects and advantages of this invention begin with a superventuri power source comprising either a series of at least two venturi tubes or a series of at least three venturi tubes whereof each of the venturi tubes includes a central axis through a substantially hollow conduit having a venturi constriction; and wherein the venturi constriction includes an inlet of nonzero length and generally decreasing normal cross-sectional area which leads to a throat of generally minimal normal cross-sectional area which, in turn, leads to an outlet of nonzero length and generally increasing normal cross-sectional area; and whereby each normal cross-sectional area is perpendicular to its respective central axis.

Another object is a superventuri power source comprising a superventuri apparatus which includes: (i) at least one twosome in the series of at least two venturi tubes labeled an alpha- and a beta-venturi tube, respectively, and of predetermined successively increasing flow capacity, respectively; (ii) the substantially hollow conduit of the alpha-venturi tube having an open entrance and an open exit adjacent its inlet and outlet, respectively, to permit flow of a selected medium through the open entrance into the venturi constriction and out of the open exit; (iii) the respective inlets of the twosome each facing the intended direction of flow of the selected medium; (iv) the open exit of the alpha-venturi tube being placed adjacent the throat of the beta-venturi tube in a manner that the respective central axes of the twosome essentially merge into a central super-axis along an intended line of flow of the selected medium; and (v) as referenced from the super-axis, the inlets of the alpha- and beta-venturi tubes being positioned to intercept relatively inner and outer portions of the selected medium as an alpha- and a beta-flow, respectively, whereby in operation the alpha-flow as exhaust from the open exit of the alpha-venturi tube joins the accelerated beta-flow adjacent the throat of the beta-venturi tube causing a pumping action by the beta-venturi tube on the alpha-venturi tube.

Too, an object is a superventuri power source comprising a beta-turbine adjacent the throat of the beta-venturi tube to recover useful rotary mechanical power from flow power of the selected medium.

Still another object is a superventuri power source whereby at least part of the open exit of the alpha-venturi tube and at least part of the beta-turbine are each placed closely adjacent the throat of the beta-venturi tube within the limit where the positional contraction ratio of the beta-venturi is greater than about eighty percent of the maximal contraction ratio of the beta-venturi tube, and wherein the positional contraction ratio of the beta-venturi tube is generally defined as the ratio between the maximal normal cross-sectional area of the inlet and the normal cross-sectional area at another point in the venturi constriction of the beta-venturi tube, and wherein the maximal contraction ratio of the beta-venturi tube at the throat is specifically defined as the ratio between the maximal normal cross-sectional area of the inlet and the minimal normal cross-sectional area of the throat of the beta-venturi tube.

Moreover, another object is a superventuri power source with the minimal normal cross-sectional area of the throat of the beta-venturi tube being greater than the maximal normal cross-sectional area of the open exit of the alpha-venturi tube.

Furthermore, another object is a superventuri power source whereby the normal pumping cross-sectional area of the beta-venturi tube, which is defined as the difference between the maximal normal cross-sectional area of the inlet of the beta-venturi tube and the maximal normal cross-sectional area of the inlet of the alpha-venturi tube, is at least as great as the maximal normal cross-sectional area of the inlet of the alpha-venturi tube.

A separate object is a superventuri power source whereby the maximal contraction ratio of the alpha-venturi tube, defined as the ratio between the maximal normal cross-sectional area of the inlet and the minimal normal cross-sectional area of the throat of the alpha-venturi tube, is greater than the respective maximal contraction ratio of the beta-venturi tube.

Another object is a superventuri power source whereby the angle of the outlet of the alpha-venturi tube is generally less than the angle of the outlet of the beta-venturi tube.

Too, an object is a superventuri power source wherein for each of the alpha- and beta-venturi tubes the length of the respective outlet is greater than the length of the respective inlet.

Still another object is a superventuri power source comprising a superventuri apparatus which includes:

(i) at least one threesome in the series of at least three venturi tubes labeled an alpha-, a beta-, and a gamma-venturi tube, respectively, and of predetermined successively increasing flow capacity, respectively; (ii) the substantially hollow conduits of the alpha- and beta-venturi tubes each having an open entrance and an open exit adjacent the respective inlet and outlet to permit flow of a selected medium through the respective open entrance into the respective venturi constriction and out of the respective open exit; (iii) the respective inlets of the threesome each facing the intended direction of flow of the selected medium; (iv) the open exit of the alpha-venturi tube being placed adjacent the throat of the beta-venturi tube and the open exit of the beta-venturi tube being placed adjacent the throat of the gamma-venturi tube in a manner that the respective central axes of the threesome essentially merge into a central super-axis along an intended line of flow of the selected medium; and (v) as referenced from the super-axis, the inlets of the alpha-, beta-, and gamma-venturi tubes being positioned to intercept relatively inner, intermediate, and outer portions of the selected medium as an alpha-, a beta-, and a gamma-flow respectively, whereby in operation the alpha-flow as exhaust from the open exit of the alpha-venturi tube joins accelerated beta-flow adjacent the throat of the beta-venturi tube and the beta-flow as exhaust from the open exit of the beta-venturi-tube, in turn, joins accelerated gamma-flow adjacent the throat of the gamma-venturi tube causing pumping actions by the beta-venturi tube on the alpha-venturi tube and by the gamma-venturi tube on the beta-venturi tube, respectively.

Moreover, another object is a superventuri power source comprising a beta-turbine adjacent the throat of the beta-venturi tube to recover useful rotary mechanical power from flow power of the selected medium while the beta-venturi tube pumps on the alpha-venturi tube and is pumped on by the gamma-venturi tube.

Furthermore, another object is a superventuri power source wherein a gamma-turbine is absent adjacent the throat of the gamma-venturi tube to prevent a Betz-Venturi conflict in the outlet of the gamma-venturi tube.

A separate object is a superventuri power source whereby the normal pumping cross-sectional area of the beta-venturi tube, which is defined as the difference between the maximal normal cross-sectional area of the inlet of the beta-venturi tube and the maximal normal cross-sectional area of the inlet of the alpha-venturi tube, is at least as great as the maximal normal cross-sectional area of the inlet of the alpha-venturi tube, and whereby the corresponding normal pumping cross-sectional area of the gamma-venturi tube relative to the beta-venturi tube, is at least as great as the maximal normal cross-sectional of the inlet of the beta-venturi tube.

Another, object is a superventuri power source whereby the maximal contraction ratio of the alpha-venturi tube, defined as the ratio between the maximal normal cross-sectional area of the inlet and the minimal normal cross-sectional area of the throat of the alpha-venturi tube, is greater than the respective maximal contraction ratio of the beta-venturi tube, and whereby the respective maximal contraction ratio of the beta-venturi tube is, in turn, greater than the respective maximal contraction ratio of the gamma-venturi tube.

Too, an object is superventuri power source whereby the angle of the outlet of the alpha-venturi tube is generally less than the angle of the outlet of the beta-venturi tube, and whereby the angle of the outlet of the beta-venturi tube is, in turn, generally less than the angle of the outlet of the gamma-venturi tube.

Still another object is a superventuri power source wherein for each of the alpha-, beta-, and gamma-venturi tubes the length of the respective outlet is greater than the length of the respective inlet.

Moreover, another object is a superventuri power source which also includes an alpha-turbine adjacent the throat of the alpha-venturi tube to recover yet more useful rotary mechanical power from flow power of the selected medium.

Furthermore, another object is a superventuri power source whereby the selected medium is composed substantially of air in a wind.

A separate object is a superventuri power source whereby the selected medium is composed substantially of a stream of liquid water.

Another object is a superventuri power source whereby the selected medium is composed substantially of steam.

Too, an object is a superventuri power source whereby the selected medium is composed substantially of carbon dioxide gas and water vapor as products of combustion.

Still another object is a superventuri power source wherein the beta-turbine includes at least one impulse blade comprising a top and a bottom with the radial length between the top and bottom being less than about three-fourths the minimal distance between the central super-axis and the closest limit of the throat of the beta-venturi tube to recover useful rotary mechanical power from flow power of the selected medium.

Moreover, another is a superventuri power source wherein:

(i) the alpha- and beta-venturi tubes of the twosome or threesome are annular and positioned concentrically along the central super-axis which is linear; (ii) the minimal diameter for the throat of the beta-venturi tube is greater than the maximal diameter for the open exit of the alpha-venturi tube; (iii) the beta-turbine includes at least one abbreviated impulse blade comprising a top and a bottom with radial length between the top and the bottom approximating half the difference between the minimal diameter for the throat of the beta-venturi tube and the maximal diameter for the open exit of the alpha-venturi tube; and (iv) the rotation radii for the top and the bottom of the abbreviated impulse blade normal to the central super-axis are approximately half the minimal diameter for the throat of the beta-venturi tube and half the maximal diameter for the open exit of the alpha-venturi tube, respectively.

Other objects and advantages of the current invention are to provide a superventuri power source which: (i) through having an elevated power amplification factor, offers generally high efficiency operation; (ii) exhibits superior performance at low rates of flow of the selected medium; (iii) through reduced blade radii, yields improved cost-effectiveness; and (iv) depending on the selected medium, may be relatively benign to the environment.

Still more objects and advantages of the invention will become apparent from the drawings and ensuing description of it.

NUMERIC CODE

Figure 1A:
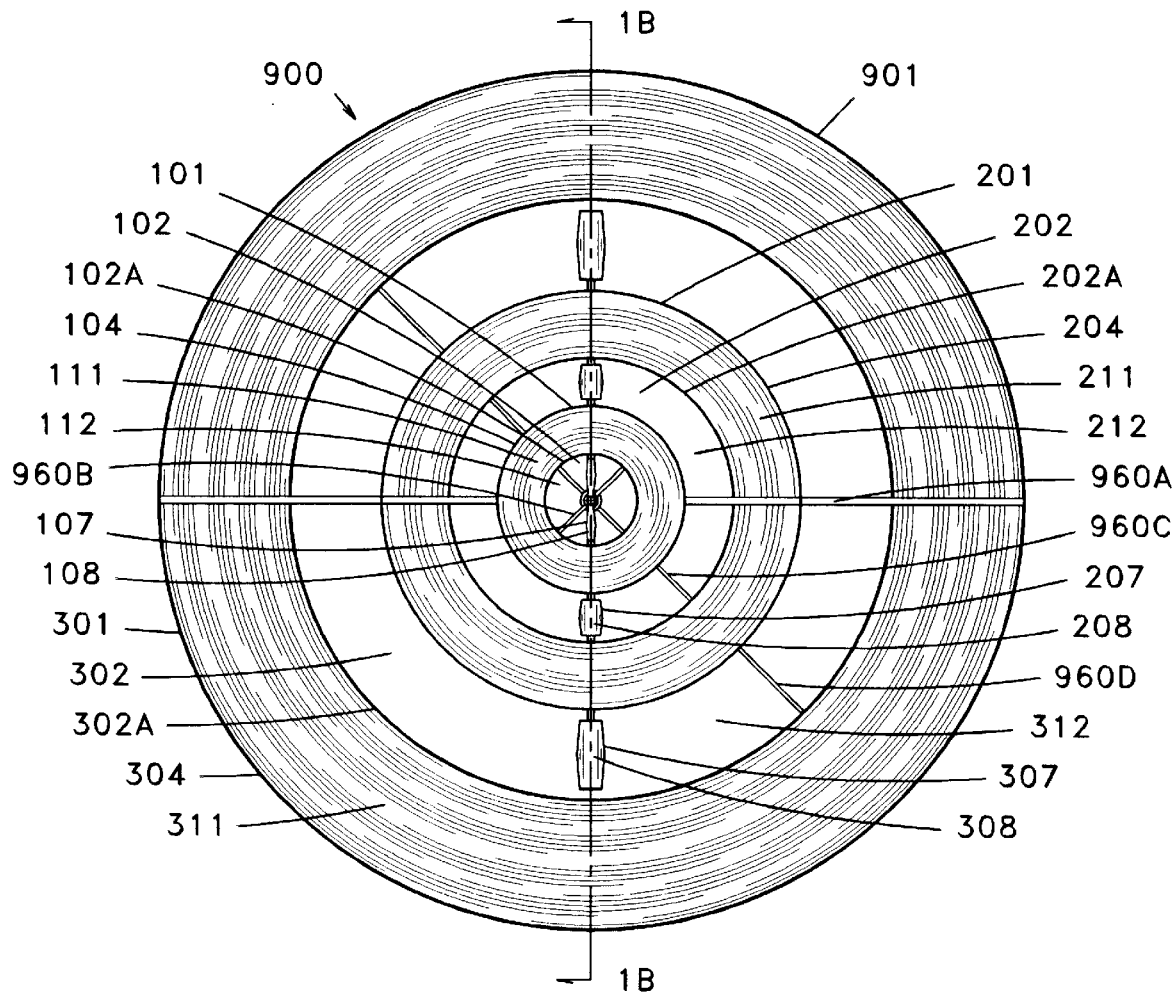
FIG. 1A is a front view of a superventuri power source of the present invention having three stages.

1–9: FIGURES
10–99: DIMENSIONS AND REFERENCE POINTS
100–999: COMPONENTS OF FIGURES

Dimensional characteristics and reference points together with components of figures follow the corresponding designations in the parent. Designations made in the corresponding list in the parent are not repeated here. However, they are again defined in the text which follows.

DIMENSIONAL CHARACTERISTICS 30 length of third-stage venturi tube 301
31 maximal diameter for inlet 311
32 minimal diameter for throat 312
33 maximal diameter for outlet 313
34 angle of inlet 311
34A length of inlet 311
35 length of throat 312
36 angle of outlet 313
36A length of outlet 313
38 radial length of abbreviated impulse blade 308

COMPONENTS OF FIGURES 308A top of abbreviated impulse blade 308
308B bottom of abbreviated impulse blade 308
401 fourth-stage venturi tube
402 hollow conduit of fourth-stage venturi tube 401
402A venturi constriction in hollow conduit 402
403 central axis through hollow conduit 402
412 throat of fourth-stage venturi constriction 402A
960D structural support for generator 309

DETAILED DESCRIPTION OF PREFERRED EMBODIMENTS

Figure 1D:
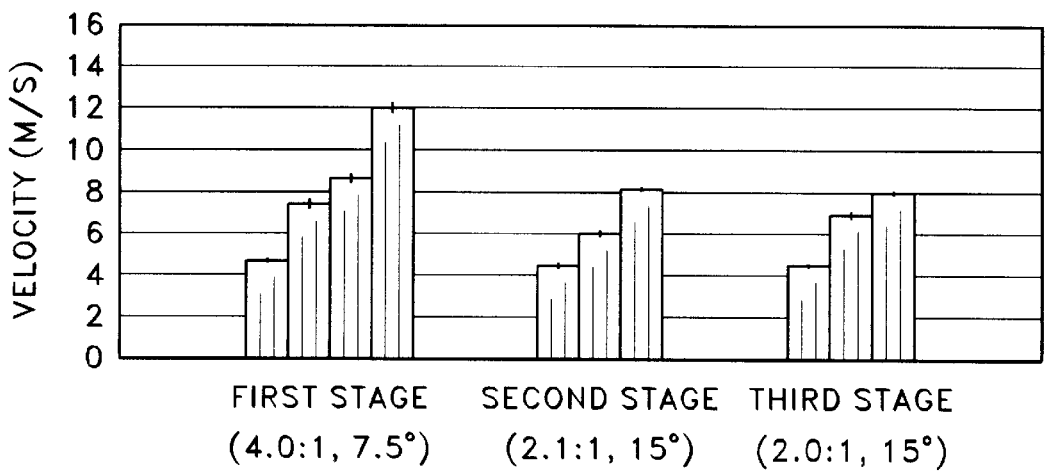
FIG. 1D is a bar graph illustrating, as experimentally determined with a respective turbine drive and generator left-to-right in each group of bars, the velocity: of the wind tunnel alone, of the throat of the respective stage alone, and, as explained in the text, of the throat of the respective stage as stages are successively combined ultimately into the superventuri power source of FIGS. 1A–1C.
Figure 1B:
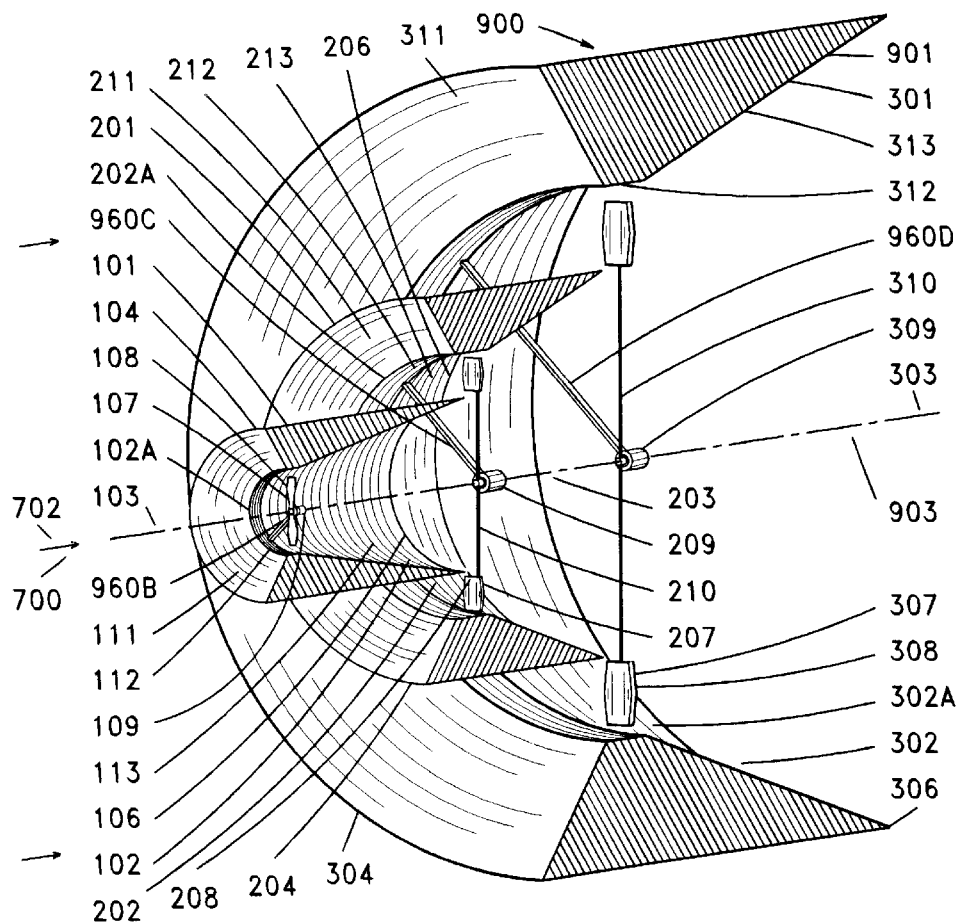
FIG. 1B is a cross-sectional perspective view of the superventuri power source of FIG. 1A as shown along the line 1B—1B.
Figure 1E:
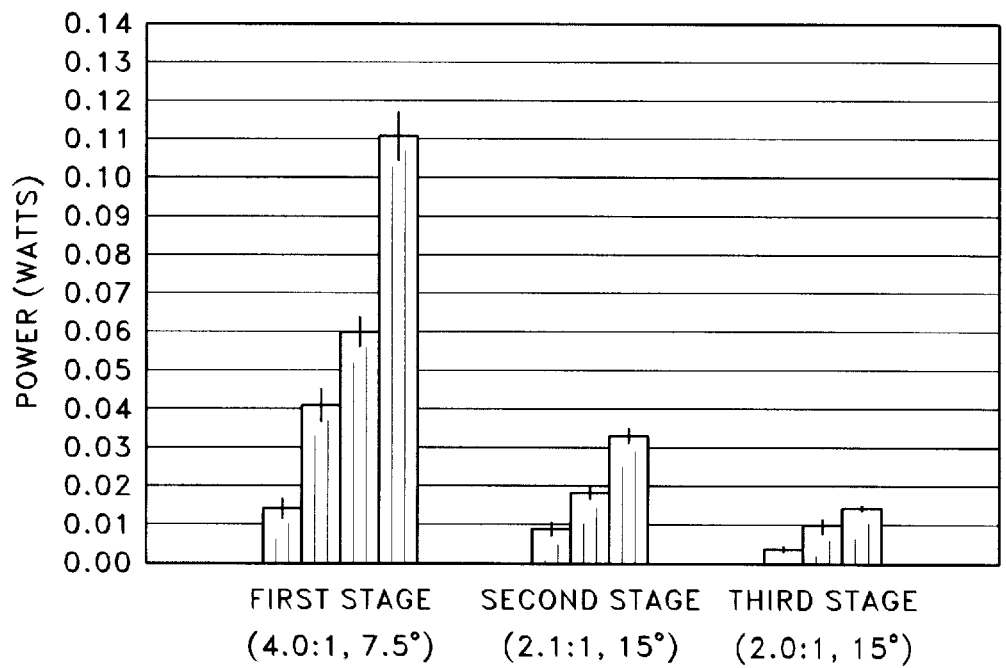
FIG. 1E is a bar graph illustrating, as experimentally determined with a respective turbine drive and generator left-to-right in each group of bars, power: from the wind tunnel alone, from the throat of the respective stage alone, and, as explained in the text, from the throat of the respective stage as stages are successively combined ultimately into the superventuri power source of FIGS. 1A–1C.
Figure 1C:
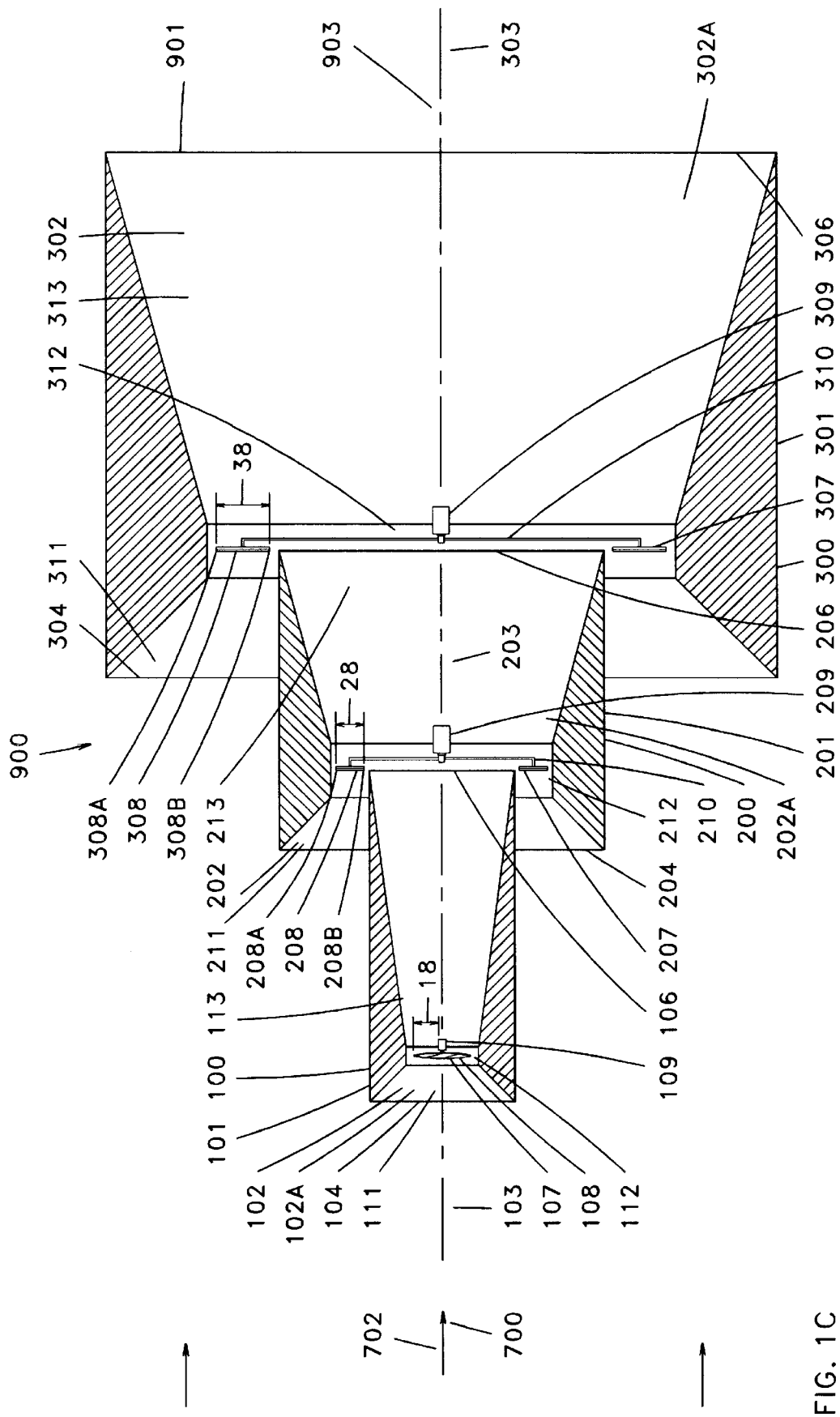
FIG. 1C is a cross-sectional side view of the superventuri power source of FIGS. 1A and 1B.

In FIG. 1A–1C number 900 refers to a superventuri power source of the present invention. In the front view of FIG. 1A superventuri power source 900 comprises a series of three venturi tubes of predetermined successively increasing flow capacity. A first-stage venturi tube 101 with a hollow conduit 102 is attached to a second-stage venturi tube 201 with a hollow conduit 202 which is in turn attached to a third-stage venturi tube 301 with a hollow conduit 302 via a pair of structural supports 960A to form a superventuri apparatus 901. First-stage venturi tube 101, which may also be labeled an initial venturi tube, has a lesser predetermined flow capacity relative to that of second-stage venturi tube 201 which in turn has a lesser predetermined flow capacity relative to that of third-stage venturi tube 301, which may also be labeled a final tube. In general in this discussion the predetermined flow capacity of the series of venturi tubes comprising a superventuri apparatus 901 thus increases from an initial venturi tube such as first-stage venturi tube 101 to a final venturi tube such as third-stage venturi tube 301.

In FIGS. 1A–1C superventuri power source 900 has a first-stage turbine 107 adjacent a throat 112 in a venturi constriction 102A of hollow conduit 102 of first-stage venturi tube 101. First-stage turbine 107 has a pair of standard impulse blades 108 attached to a first-stage generator 109. Superventuri power source 900 also has a second-stage turbine 207 adjacent a throat 212 in a venturi constriction 202A of hollow conduit 202 of venturi tube 201. It is noteworthy that second-stage turbine 207 has a pair of abbreviated impulse blades 208 attached to a second-stage generator 209 via a pair thin connectors 210. Finally, superventuri power source 900 also has a third-stage turbine 307 adjacent a throat 312 in a venturi constriction 302A of hollow conduit 302 of venturi tube 301. Third-stage turbine 307 also has a pair of abbreviated impulse blades 308 attached to a third-stage generator 309 via a pair thin connectors 310.

In FIGS. 1A–1B it is seen that first-stage generator 109 is attached to throat 112 via a pair of structural supports 960B. In turn, second-stage generator 209 is attached to throat 212 via a pair of structural supports 960C, and third-stage generator 309 is attached to throat 312 via a pair of structural supports 960D.

Reference to FIG. 1B, which is a cross-sectional perspective view of superventuri power source 900 of FIG. 1A along the line 1B—1B, will be helpful in understanding the details of the structure for venturi tubes 101, 201, and 301 of superventuri apparatus 901. However, a comparison of FIG. 1B with FIG. 1A reveals that for illustrative purposes turbines 107, 207, and 307, generators 109, 209, and 309, and thin connectors 210 and 310 remain fully intact instead of being cut in half in FIG. 1B.

Prominent in FIG. 1B are a central axis 103 through hollow conduit 102 having venturi constriction 102A in venturi tube 101, a central axis 203 through hollow conduit 202 having venturi constriction 202A in venturi tube 201, and a central axis 303 through hollow conduit 302 having venturi constriction 302A in venturi tube 301. It is seen that an open exit 106 of first-stage venturi tube 101 is placed adjacent the throat 212 of second-stage venturi tube 201, and, in turn, that an open exit 206 of second-stage venturi tube 201 is placed adjacent the throat 312 of the throat of third-stage venturi tube 301. Too, the respective central axes 103, 203, and 303 of the three venturi tubes 101, 201, and 301 essentially merge into a central super-axis 903 along an intended line of flow 702 of the selected medium.

Venturi constriction 102A of tube 101 includes an inlet 111 of nonzero length and generally decreasing normal cross-sectional area which leads to throat 112 of generally minimal normal cross-sectional area, which in turn leads to an outlet 113 of nonzero length and generally increasing normal cross-sectional area. Too, venturi constriction 202A of tube 201 includes an inlet 211 of nonzero length and generally decreasing normal cross-sectional area which leads to throat 212 of generally minimal normal cross-sectional area, which in turn leads to an outlet 213 of nonzero length and generally increasing normal cross-sectional area. In turn, venturi constriction 302A of tube 301 includes an inlet 311 of nonzero length and generally decreasing normal cross-sectional area which leads to throat 312 of generally minimal normal cross-sectional area, which in turn leads to an outlet 313 of nonzero length and generally increasing normal cross-sectional area. Here, each normal cross-sectional area is perpendicular to its respective central axis, either 103, 203, or 303.

Reference to FIG. 1C which is a cross-sectional side view of superventuri power source 900 of FIGS. 1A and 1B will assist in understanding that hollow conduit 102 of first-stage venturi tube 101 has an open entrance 104 and open exit 106 adjacent its inlet 111 and outlet 113, respectively, to permit flow 702 of the selected medium through open entrance 104 into venturi constriction 102A and out of open exit 106. Similarly hollow conduit 202 of second-stage venturi tube 201 has an open entrance 204 and open exit 206 adjacent its inlet 211 and outlet 213, respectively, to permit flow 702 of the selected medium through open entrance 204 into venturi constriction 202A and out of open exit 206. Finally, hollow conduit 302 of third-stage venturi tube 301 also has an open entrance 204 and an open exit 306 adjacent its inlet 311 and outlet 313, respectively, to permit free flow 702 of the selected medium through open entrance 304 into venturi constriction 302A and out of open exit 306. However, as discussed in the parent open entrance 304 and open exit 306 are not necessary in the final stage of a superventuri power source 900 because the power source 900 might as well be surrounded by a flow conveyor which causes forced flow 702 into and through the power source 900.

Also, respective inlets 111, 211, and 311 of the threesome of venturi tubes 101, 201, and 301 each face an intended direction of flow 700 of the selected medium. Finally, as referenced from super-axis 903, inlets 111, 211, and 311 of first-, second-, and third-stage venturi tubes 101, 201, and 301 are positioned to intercept relatively inner, intermediate, and outer portions of the selected medium. In operation the inner portion as exhaust from open exit 106 of first-stage venturi tube 101 joins the accelerated intermediate portion adjacent throat 212 of second-stage venturi tube 201, and the intermediate portion as exhaust from open exit 206 of second-stage venturi tube 201 joins the accelerated outer portion adjacent throat 312 of third-stage venturi tube 301 causing pumping actions by the second-stage venturi tube 201 on the first-stage venturi tube 101 and by the third-stage venturi tube 301 on the second-stage venturi tube 201, respectively.

FIG. 1C also illustrates a distinction between standard impulse blade 108 of first-stage turbine 107 and abbreviated impulse blades 208 and 308 of second- and third-stage turbines 207 and 307, respectively. A radial length 18 of standard impulse blade 108 approximates the span between a top at the tip of standard impulse blade 108 and a bottom adjacent central super-axis 903. As in the parent, radial length 18 of standard impulse blade 108 is slightly less than the span between the tip and central super-axis 903 because of the contribution from a central hub which is shown more clearly in FIGS. 1A–1B. Again in this discussion, a radial length for a blade is taken to imply active length over which the impulse blade promotes rotation about an axis. This length will usually be characterized by the distance over which the blade has pitch angle. Too, the term radial length, as illustrated in the figures, implies a length normal to the axis of rotation which is here central super-axis 903 in every case.

However, a radial length 28 between a top 208A and a bottom 208B of abbreviated impulse blade 208 approximates the difference between the minimal radius of throat 212 and the maximal radius of open exit 106. Here radial length 28, is less than the specified difference, but under other geometric arrangements of superventuri apparatus 901 it might be greater than the specified difference. Abbreviated impulse blade 208 may also be described more simply as impulse blade 208 which stresses its similarity to impulse blade 108.

Too, a radial length 38 between a top 308A and a bottom 308B of abbreviated impulse blade 308 approximates the difference between the minimal radius of throat 312 and the maximal radius of open exit 206. Again, radial length 38, is less than the specified difference, but under other geometric arrangements of superventuri apparatus 901 it might as well be greater than the specified difference. Also, abbreviated impulse blade 308 may also be described more simply as impulse blade 308 which stresses its similarity to impulse blade 108.

Before turning some of the more detailed and preferred characteristics of the embodiment in FIGS. 1A–1C and FIG.

Figure 2:
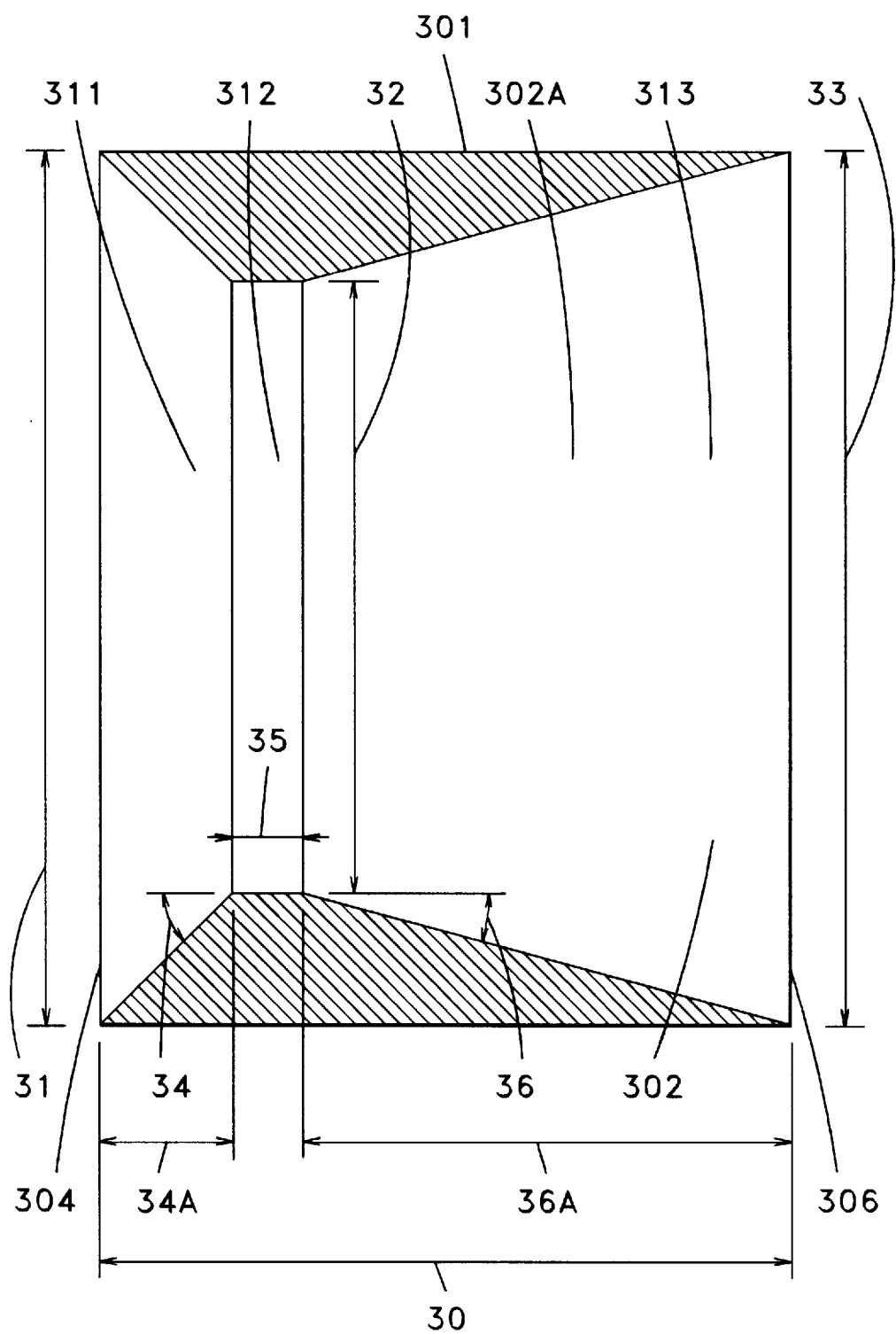
FIG. 2 is a cross-sectional side view illustrating some dimensional characteristics of a third-stage venturi tube of a superventuri apparatus wherein the corresponding dimensional characteristics of the first- and second-stage venturi tubes of the superventuri apparatus are represented in FIG. 4A of the parent.

3, it will be helpful to also refer to the cross-sectional side view of FIG. 2. In FIG. 2 some dimensional characteristics are shown for a third-stage venturi tube 301.

In FIG. 2 third-stage venturi tube 301 has a maximal diameter 31 for inlet 311, minimal diameter 32 for throat 312, and a maximal diameter 33 for outlet 313. It will be apparent that the associated maximal or minimal normal cross-sectional area associated with each diameter is proportional to the square of that diameter halved. Also illustrated in FIG. 2 are an angle 34 and a length 34A of inlet 311, a length 35 of throat 312, an angle 36 and a length 36A of outlet 313, and a length 30 of third-stage venturi tube 301.

Figure 3:
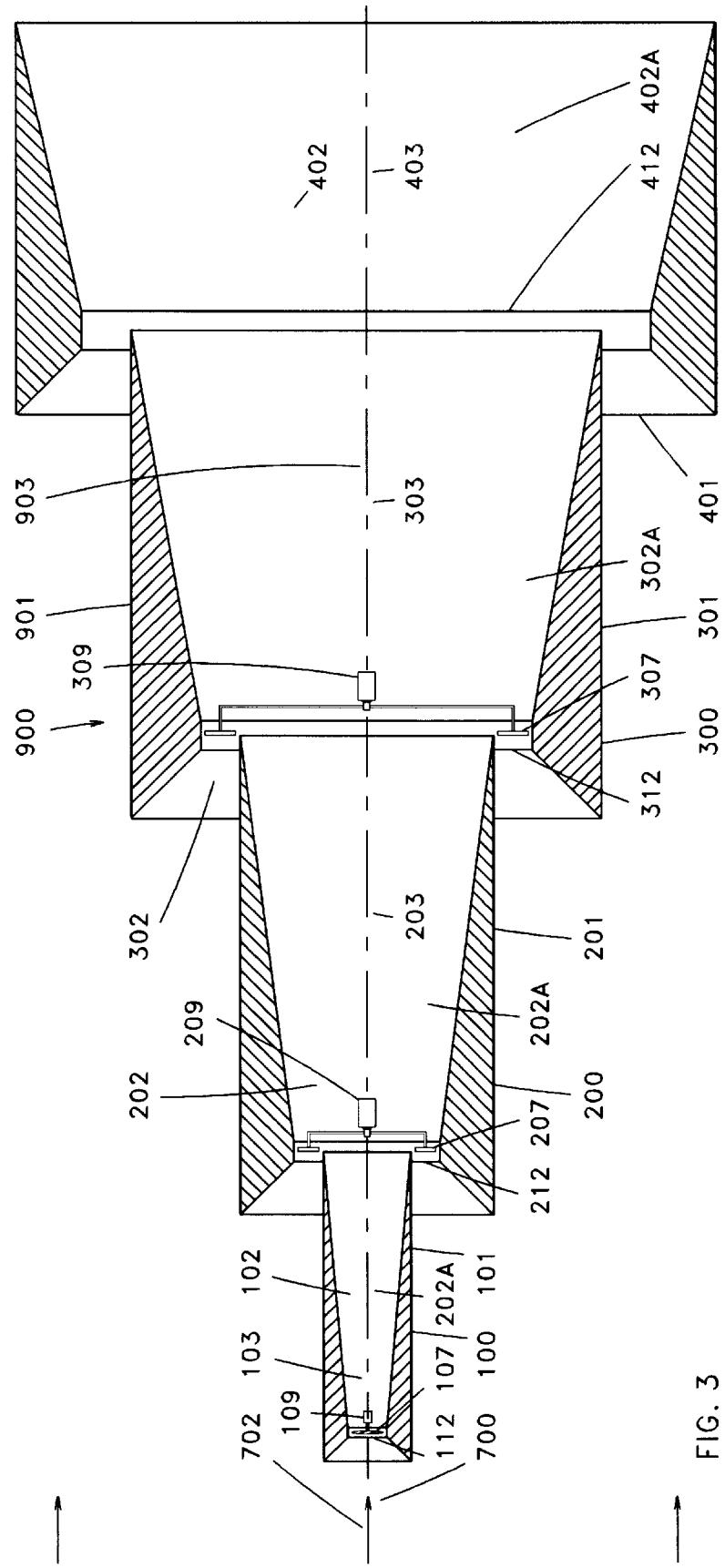
FIG. 3 is a cross-sectional side view of yet another superventuri power source of the present invention having four stages with the fourth-stage venturi tube acting as a pumping stage exclusively.

FIG. 3 is a cross-sectional side view of yet another manifestation of a superventuri power source 900 of the present invention which includes four stages. This superventuri power source 900 is similar in design to that in FIGS. 1A–1C herein since it also has turbines 107, 207, and 307 adjacent throats 112, 212, and 312 in venturi constrictions 102A, 202A, and 302A of venturi tubes 101, 201 and 301, respectively. Again turbines 107, 207, and 307 are attached to generators 109, 209, and 309, respectively.

However, a fourth-stage venturi tube 401 with a turbine absent adjacent its throat 412 pumps on third-stage venturi tube 301. Accordingly, fourth-stage venturi tube 401 with venturi constriction 402A in hollow conduit 401 along central axis 403 of superventuri power source 900 in FIG. 3 can be viewed as being an pumping stage whose purpose is to prevent a Betz-Venturi conflict in the outlet of the fourth and final stage of this superventuri power source 900.

For purposes of clarity, the components of FIG. 3 are not labeled in the detailed fashion illustrated in FIGS. 1A–1C. However, components for venturi power sources 100, 200, and 300 in FIG. 3 are similar to components for venturi power sources 100, 200, and 300 having numeric series 100–113, 200–213, and 300–313, respectively, in FIGS. 1A–1C. Of course, components for fourth-stage venturi tube 401 are similar to components for third-stage venturi tube 301 in FIG. 3 except that fourth-stage venturi tube 401 has no turbine nor generator. Too, it is worth mentioning that superventuri power source 900 in FIG. 3, like superventuri power source 900 in FIGS. 1A–1C, is annular in shape. Also, the drawings of both superventuri power sources 900, particularly as represented in FIG. 1A, FIG. 1C, and FIG. 3 are drawn to scale.

Continuing the practice in the parent, two approaches toward designating venturi tubes as components in FIGS. 1A–1C and FIG. 3 are employed. The first, or absolute approach, employs designations such as a first-, second-, third-, or fourth-stage component. This absolute list is now expanded to include an initial and a final component of a superventuri apparatus.

As in the parent, the second or relative approach employs designations such as alpha-, beta-, gamma-, or delta-component, etc. The difference between the absolute and relative approaches is that, a first-stage component, or initial component, is always just that. In contrast, a fourth-stage component may be a delta-component to a third-stage component which is relatively designated a gamma-component, or a fourth-stage component may be a gamma-component to a third-stage component which is relatively designated a beta-component, or a fourth stage component may be a beta-component to a third-stage component which is relatively designated an alpha-component.

Corresponding designations for other components such as generators and turbines may also follow this lead. For example, a venturi tube of interest might be labeled a beta-venturi tube and have associated with it a beta-turbine and a beta-generator.

In FIGS. 1A–1C there are two separate series of at least two venturi tubes which form twosomes of venturi tubes. The first series is first-stage venturi tube 101 as an alpha-venturi tube and second-stage venturi tube 201 as a beta-venturi tube. The second series is second-stage venturi tube 201 as an alpha-venturi tube and third-stage venturi tube 301 as a beta-venturi tube.

In FIG. 3 there are three separate series of at least two venturi tubes which form twosomes of venturi tubes. The first and second series in FIG. 3 are the same as the series identified in FIGS. 1A–1C in the preceding paragraph. The third series in FIG. 3 is third-stage venturi tube 301 as an alpha-venturi tube and fourth-stage venturi tube 401 as a beta-venturi tube. In summary, these five twosomes in FIGS. 1A–1C and FIG. 3 will be hereinafter referred to as the five identified twosomes.

In FIGS. 1A–1C there is just one series of at least three venturi tubes which forms a threesome of venturi tubes. It is first-stage venturi tube 101 as an alpha-venturi tube, second-stage venturi tube 201 as a beta-venturi tube, and third-stage venturi 301 as a gamma-venturi tube.

In FIG. 3 there are two separate series of at least three venturi tubes which form threesomes of venturi tubes. The first series is the same as the series identified in FIGS. 1A–1C in the preceding paragraph. The second series is second-stage venturi tube 201 as an alpha-venturi tube, third-stage venturi tube 301 as a beta-venturi tube, and fourth-stage venturi tube 401 as a gamma-venturi tube. In summary, these three threesomes in FIGS. 1A–1C and FIG. 3 will be hereinafter referred to as the three identified threesomes.

Regarding the aforementioned series of venturi tubes in FIGS. 1A–1C and FIG. 3, in general each of the superventuri power sources 900 in these figures comprises either a series of at least two venturi tubes or a series of at least three venturi tubes. Furthermore, each of the venturi tubes in these series includes a central axis through a substantially hollow conduit having a venturi constriction. Too, each of the venturi constrictions includes an inlet of nonzero length and generally decreasing normal cross-sectional area which leads to a throat of generally minimal normal cross-sectional area which, in turn leads to an outlet of nonzero length and generally increasing normal cross-sectional area; and whereby each normal cross-sectional area is perpendicular to its respective central axis.

With respect to the five identified twosomes, each of the superventuri power sources in FIGS. 1A–1C and FIG. 3 comprises a superventuri apparatus which includes: (i) at least one twosome in the series of at least two venturi tubes labeled an alpha- and a beta-venturi tube, respectively, and of predetermined successively increasing flow capacity, respectively; (ii) the substantially hollow conduit of the alpha-venturi tube having an open entrance and an open exit adjacent its inlet and outlet, respectively, to permit flow of a selected medium through the open entrance into the venturi constriction and out of the open exit; (iii) the respective inlets of the twosome each facing the intended direction of flow of the selected medium; (iv) the open exit of the alpha-venturi tube being placed adjacent the throat of the beta-venturi tube in a manner that the respective central axes of the twosome essentially merge into a central super-axis along an intended line of flow of the selected medium; and (v) as referenced from the super-axis, the inlets of the alpha- and beta-venturi tubes being positioned to intercept relatively inner and outer portions of the selected medium as an alpha- and a beta-flow, respectively, whereby in operation the alpha-flow as exhaust from the open exit of the alpha-venturi tube joins the accelerated beta-flow adjacent the throat of the beta-venturi tube causing a pumping action by the beta-venturi tube on the alpha-venturi tube.

In each of the five identified twosomes excepting the last in FIG. 3 which consists of venturi tubes 301 and 401, there is a beta-turbine adjacent the throat of the beta-venturi tube. Accordingly, the object of a superventuri power source comprising a beta-turbine adjacent the throat of the beta-venturi tube to recover useful rotary mechanical power from flow power of the selected medium is fulfilled in these four of the five possible twosomes.

Another object which is fulfilled in these same four of five possible twosomes is a superventuri power source whereby at least part of the open exit of the alpha-venturi tube and at least part of the beta-turbine are each placed closely adjacent the throat of the beta-venturi tube within the limit where the positional contraction ratio of the beta-venturi tube is greater than about eighty percent of the maximal contraction ratio of the beta-venturi tube, and wherein the positional contraction ratio of the beta-venturi tube is generally defined as the ratio between the maximal normal cross-sectional area of the inlet and the normal cross-sectional area at another point in the venturi constriction of the beta-venturi tube, and wherein the maximal contraction ratio of the beta-venturi tube at the throat is specifically defined as the ratio between the maximal normal cross-sectional area of the inlet and the minimal normal cross-sectional area of the throat of the beta-venturi tube.

Moreover, another object which is fulfilled in these same four of five possible twosomes is a superventuri power source with the minimal cross-sectional area of the throat of the beta-venturi tube being greater than the maximal normal cross-sectional area of the open exit of the alpha-venturi tube.

Returning now to consideration of each of the five identified twosomes still more of the objects are fulfilled in every case. One is a superventuri power source whereby the normal pumping cross-sectional area of the beta-venturi tube, which is defined as the difference between the maximal normal cross-sectional area of the inlet of the beta-venturi tube and the maximal normal cross-sectional area of the inlet of the alpha-venturi tube, is at least as great as the maximal normal cross-sectional area of the inlet of the alpha-venturi tube. Another is a superventuri power source whereby the maximal contraction ratio of the alpha-venturi tube, defined as the ratio between the maximal normal cross-sectional area of the inlet and the minimal normal cross-sectional area of the throat of the alpha-venturi tube, is greater than the respective maximal contraction ratio of the beta-venturi tube. Still another is a superventuri power source whereby the angle of the outlet of the alpha-venturi tube is generally less than the angle of the outlet of the beta-venturi tube. Yet another is a superventuri power source wherein for each of the alpha- and beta-venturi tubes the length of the respective outlet is greater than the length of the respective inlet. Regarding this latter point, in FIG. 2 length 36A of outlet 313 is seen to be greater than length 34A of inlet 311. By inspection, then, this same relationship also holds for every venturi tube exhibited in FIG. 1C and FIG. 3.

With respect to the three identified threesomes, each fulfills the requirement for a superventuri power source comprising a superventuri apparatus which includes: (i) at least one threesome in the series of at least three venturi tubes labeled an alpha-, a beta-, and a gamma-venturi tube, respectively, and of predetermined successively increasing flow capacity, respectively; (ii) the substantially hollow conduits of the alpha- and beta-venturi tubes each having an open entrance and an open exit adjacent the respective inlet and outlet to permit flow of a selected medium through the respective open entrance into the respective venturi constriction and out of the respective open exit; (iii) the respective inlets of the threesome each facing the intended direction of flow of the selected medium; (iv) the open exit of the alpha-venturi tube being placed adjacent the throat of the beta-venturi tube and the open exit of the beta-venturi tube being placed adjacent the throat of the gamma-venturi tube in a manner that the respective central axes of the threesome essentially merge into a central super-axis along an intended line of flow of the selected medium; and (v) as referenced from the super-axis, the inlets of the alpha-, beta-, and gamma-venturi tubes being positioned to intercept relatively inner, intermediate, and outer portions of the selected medium as an alpha-, a beta-, and a gamma-flow respectively, whereby in operation the alpha-flow as exhaust from the open exit of the alpha-venturi tube joins accelerated beta-flow adjacent the throat of the beta-venturi tube and the beta-flow as exhaust from the open exit of the beta-venturi-tube, in turn, joins accelerated gamma-flow adjacent the throat of the gamma-venturi tube causing pumping actions by the beta-venturi tube on the alpha-venturi tube and by the gamma-venturi tube on the beta-venturi tube, respectively.

In each of the three identified threesomes there is a beta-turbine adjacent the throat of the beta-venturi tube. Accordingly, the object of a superventuri power source comprising a beta-turbine adjacent the throat of the beta-venturi tube to recover useful rotary mechanical power from flow power of the selected medium while the beta-venturi tube pumps on the alpha-venturi tube and is pumped on by the gamma-venturi tube is fulfilled in each of these threesomes.

However, a gamma-turbine is absent adjacent the throat of the gamma-venturi tube in one case. It is the last of the three identified threesomes which comprises venturi tubes 201, 301, and 401 in FIG. 3. Therefore, the object of a superventuri power source wherein a gamma-turbine is absent adjacent the throat of the gamma-venturi tube to prevent a Betz-Venturi conflict in the outlet of the gamma-venturi tube is fulfilled in this last of the three identified threesomes. Too, some experiments were run with the superventuri power source 900 as illustrated in FIGS. 1A–1C except that turbine 307 and generator 309 were removed. Therefore, the object of having a gamma-turbine absent was also fulfilled in the threesome comprising venturi tubes 101, 201, and 301 of FIGS. 1A–1C in some experiments.

Returning now to consideration of each of the three identified threesomes still more of the objects are fulfilled in every case. One is a superventuri power source whereby the normal pumping cross-sectional area of the beta-venturi tube, which is defined as the difference between the maximal normal cross-sectional area of the inlet of the beta-venturi tube and the maximal normal cross-sectional area of the inlet of the alpha-venturi tube, is at least as great as the maximal normal cross-sectional area of the inlet of the alpha-venturi tube, and whereby the corresponding normal pumping cross-sectional area of the gamma-venturi tube relative to the beta-venturi tube, is at least as great as the maximal normal cross-sectional of the inlet of the beta-venturi tube.

Another object which is fulfilled for each of the three identified threesomes is a superventuri power source whereby the maximal contraction ratio of the alpha-venturi tube, defined as the ratio between the maximal normal cross-sectional area of the inlet and the minimal normal cross-sectional area of the throat of the alpha-venturi tube, is greater than the respective maximal contraction ratio of the beta-venturi tube, and whereby the respective maximal contraction ratio of the beta-venturi tube is, in turn, greater than the respective maximal contraction ratio of the gamma-venturi tube. Yet another is a superventuri power source wherein for each of the alpha-, beta-, and gamma-venturi tubes the length of the respective outlet is greater than the length of the respective inlet. An object which is fulfilled in each of the two identified threesomes of FIG. 3 is a superventuri power source whereby the angle of the outlet of the alpha-venturi tube is less than the angle of the outlet of the beta-venturi tube, and whereby the angle of the outlet of the beta-venturi tube is less than the angle of the outlet of the gamma-venturi tube.

Other of the objects can be met for the case of a superventuri power source whether it is defined by the any of the five identified twosomes or by any of the three identified threesomes. A first is a superventuri power source which also includes an alpha-turbine adjacent the throat of the alpha-venturi tube to recover yet more useful rotary mechanical power from flow power of the selected medium. Another is a superventuri power source whereby the selected medium is composed substantially of air in a wind. Still another is a superventuri power source whereby the selected medium is composed substantially of a stream of liquid water. Yet another is a superventuri power source whereby the selected medium is composed substantially of steam. A final is a superventuri power source whereby the selected medium is composed substantially of carbon dioxide gas and water vapor as products of combustion.

As stated earlier there is a beta-turbine adjacent the throat of the beta-venturi tube in each of the three identified threesomes and in each of the five identified twosomes excepting the last identified twosome in FIG. 3 which consists of venturi tubes 301 and 401. Then for each of these cases excepting the last identified twosome, there is a superventuri power source wherein the beta-turbine includes at least one impulse blade comprising a top and a bottom with the radial length between the top and bottom being less than about three-fourths the minimal distance between the central super-axis and the closest limit of the throat of the beta-venturi tube to recover useful rotary mechanical power from flow power of the selected medium. Still another object fulfilled for these cases is a superventuri power source wherein: (i) the alpha- and beta-venturi tubes of the twosome or threesome are annular and positioned concentrically along the central super-axis which is linear; (ii) the minimal diameter for the throat of the beta-venturi tube is greater than the maximal diameter for the open exit of the alpha-venturi tube; (iii) the beta-turbine includes at least one abbreviated impulse blade comprising a top and a bottom with radial length between the top and the bottom approximating half the difference between the minimal diameter for the throat of the beta-venturi tube and the maximal diameter for the open exit of the alpha-venturi tube; and(iv) the rotation radii for the top and the bottom of the abbreviated impulse blade normal to the central super-axis are approximately half the minimal diameter for the throat of the beta-venturi tube and half the maximal diameter for the open exit of the alpha-venturi tube, respectively.

OPERATION OF THE INVENTION

The explanation of the operation of the current invention follows the format of the parent. It includes an updating of theory, new experiments, and additional confirming results. The concluding sub-section contains a more general empirical statement of the theory.

THEORETICAL SUB-SECTION. Reference to the cross-sectional side view of FIG. 2 will prove helpful in following the development of the theory. Once again, it illustrates some dimensional characteristics of a third-stage venturi tube 301 of a superventuri apparatus. The corresponding dimensional characteristics of the first- and second-stage venturi tubes 101 and 201 of the superventuri apparatus are presented in FIG. 4A of the parent.

The development proceeds from consideration of separated venturi tube 301 in FIG. 2 of this work together with separated venturi tubes 201 and 101 in FIG. 4A of the parent to fully merged three-stage superventuri apparatuses 901 such as found in FIG. 3 of the parent and FIGS. 1A–1C of this work. Outcomes are predicted orders of throat velocities and pressures in a three-stage superventuri apparatus. There is also an extension of the predicted multiplicative effect on the throat velocity of a lower stage from pumping by an upper stage or by upper stages. The latter continues to be of interest because it strongly suggests the superventuri apparatus to be a potentially powerful flow accelerator.

With the exception of the velocity u and pressure P of the selected medium, subscripts for velocities, pressures, and cross-sectional areas in what follows are keyed to their respective diameters in FIG. 2 herein and in FIG. 4A of the parent. For example, in FIG. 2 herein the diameter of throat 312 of venturi tube 301 is length 32 which leads to velocity $u_{32}$, pressure $P_{32}$, and normal cross-sectional area $A_{32}$ at throat 312.

Accordingly, EQNS. 9 and 10 are relationships, respectively, for velocity $u_{32}$ in meters per second and pressure $P_{32}$ in pascals at throat 312 of separated venturi tube 301 illustrated in FIG. 2 herein. Other terms for EQN. 9 include: the velocity of the $$u_{32}=k_3(A_{31}/A_{32})u \qquad \text{(EQN. 9)}$$

$$P_{32}=P-\tfrac{1}{2}\rho(u_{32}^2-u^2) \qquad \text{(EQN. 10)}$$

selected medium, u, adjacent entrance 304 at inlet 311 in meters per second; the maximal normal cross-sectional area, $A_{31}$, of inlet 311 in square meters; the minimal normal cross-sectional area, $A_{32}$, of throat 312 in square meters; and an efficiency factor, $k_3$, for venturi tube 301 in dimensionless units. Hence, EQN. 9 is a practical representation of the continuity equation corrected for effects such as the geometry of the device as well as the velocity, turbulence, viscosity, and drag of the selected medium. In EQN. 9, since usually $k_3(A_{31}/A_{32})>1$, then usually $u_{32}>u$.

Other terms for EQN. 10 include: the pressure of the selected medium, P, adjacent entrance 304 at inlet 311 in pascals and its density, ρ, assumed constant in kilograms per cubic meter. Of course, EQN. 10 is a basic representation of the Bernoulli equation with uncorrected terms for kinetic and internal energy. In EQN. 10, since usually $u_{32}>u$, then usually $P_{32}>P$.

Similarly, EQNS. 3A and 4A are relationships, respectively, for velocity $u_{22}$ in meters per second and pressure $P_{22}$ in pascals at throat 212 of separated venturi tube 201 illustrated to right in FIG. 4A of the parent. These equations are seen to be modified versions, respectively, of EQNS. 3 and 4 of the parent to reflect the velocity of the selected medium, $u_{23}$, and its pressure, $P_{23}$, adjacent exit 206 at outlet 213 rather than adjacent entrance 204 at inlet 211. Other terms for EQN. 3A include: the velocity of the $$u_{22}=k_2(A_{23}/A_{22})u_{23} \quad \text{(EQN. 3A)}$$

$$P_{22}=P_{23}-\tfrac{1}{2}\rho(u_{22}^2-u_{23}^2) \quad \text{(EQN. 4A)}$$

selected medium, $u_{23}$, adjacent exit 206 at outlet 213 in meters per second; the maximal normal cross-sectional area, $A_{23}$, of outlet 213 in square meters; the minimal normal cross-sectional area, $A_{22}$, of throat 212 in square meters; and an efficiency factor, $k_2$, for venturi tube 201 in dimensionless units. In EQN. 3A, since usually $k_2(A_{23}/A_{22})>1$, then usually $u_{22}>u_{23}$.

The other term in EQN. 4A is the pressure of the selected medium, $P_{23}$, adjacent exit 206 at outlet 213 in pascals. In EQN. 4A, since usually $u_{22}>u_{23}$, then usually $P_{22}<P_{23}$.

Finally, EQNS. 5 and 6, repeated here from the parent, are relationships, respectively, for velocity, $u_{12}$, in meters per second and pressure, $P_{12}$, in pascals at throat 112 of separated venturi tube 101 illustrated to the left in FIG. 4A of the parent. Other terms for EQN. 5 include: the velocity $$u_{12}=k_1(A_{13}/A_{12})u_{13} \quad \text{(EQN. 5)}$$

$$P_{12}=P_{13}-\tfrac{1}{2}\rho(u_{12}^2-u_{13}^2) \quad \text{(EQN. 6)}$$

of the selected medium, $u_{13}$, adjacent exit 106 at outlet 113 in meters per second; the maximal normal cross-sectional area, $A_{13}$, of outlet 113 in square meters; the minimal normal cross-sectional area, $A_{12}$, of throat 112 in square meters; and an efficiency factor, $k_1$, for venturi tube 101 in dimensionless units. In EQN. 5, since usually $k_1(A_{13}/A_{12})>1$, then usually $u_{12}>u_{13}$.

The other term for EQN. 6 is the pressure of the selected medium, $P_{13}$, adjacent exit 106 at outlet 113 in pascals. In EQN. 6, since usually $u_{12}>u_{13}$, then usually $P_{12}<P_{13}$.

The development continues by first merging the separated third- and second-stage venturi tubes 301 and 201 in FIG. 2 herein and to the right in FIG. 4A of the parent, respectively, into an intermediate superventuri apparatus having only the last two stages of the three-stage systems shown in FIG. 3 of the parent and FIGS. 1A–1C herein. Under these circumstances the velocity $u_{23}$ of the selected medium as exhaust at exit 206 adjacent outlet 213 of second-stage venturi tube 201 approximately equals the velocity $u_{32}$ of the accelerated selected medium adjacent the throat 312 of third-stage venturi tube 301.

Replacement of $u_{23}$ for $u_{32}$ in EQN. 9 followed by substitution of the right-hand-side of EQN 9 for $u_{23}$ in EQN. 3A gives EQN. 7A.

$$u_{22}=k_2(A_{23}/A_{22})k_3(A_{31}/A_{32})u \quad \text{(EQN. 7A)}$$

Now, since $u_{32}>u$, $u_{22}>u_{23}$, and $u_{23}=u_{32}$, we also have the predicted order of velocities, $u_{22}>u_{32}>u$. Furthermore, since $P_{32}<P$, $P_{22}<P_{23}$, and $P_{23}=P_{32}$, we also have the predicted order of pressures, $P_{22}<P_{32}<P$.

Finally in the development, the now merged second- and third-stage venturi tubes 201 and 301 are in turn merged with the first-stage venturi tube 101 shown to the left in FIG. 4A of the parent to form a three-stage superventuri apparatus 901 as illustrated in FIG. 3 of the parent and FIGS. 1A–1C herein. Under these circumstances the velocity $u_{13}$ of the selected medium as exhaust at exit 106 adjacent outlet 113 of first-stage venturi tube 101 approximately equals the velocity $u_{22}$ of the accelerated selected medium adjacent the throat 212 of second-stage venturi tube 201.

Replacement of $u_{13}$ for $u_{22}$ in EQN. 7A followed by substitution of the right-hand-side of EQN 7A for $u_{13}$ in EQN. 5 gives EQN. 7B.

$$u_{12}=k_1(A_{13}/A_{12})k_2(A_{23}/A_{22})k_3(A_{31}/A_{32})u \quad \text{(EQN. 7B)}$$

Now, since $u_{22}>u_{32}>u$, $u_{12}>u_{13}$, and $u_{13}=u_{22}$, we also have the predicted order of velocities, $u_{12}>u_{22}>u_{32}>u$. Furthermore, since $P_{22}<P_{32}<P$, $P_{12}<P_{13}$, and $P_{13}=P_{22}$, we also have the predicted order of pressures, $P_{12}<P_{22}<P_{32}<P$.

EXPERIMENTAL SUB-SECTION. Experiments were conducted in a wind tunnel which was 1.2 meters in diameter and 2.4 meters in length (4'D×8'L). A Patton Model 48EBD portable blower which was also 1.2 meters in diameter and which had a flow rating of 10.1 cubic meters per second was positioned at the front end of the tunnel opposite the test section toward the back end. A SquareD Model 77104 Voltage Regulator having an output of 117±8.2 volts was positioned between the blower and the line.

The blower pushed air through an egg crate straightening and focussing element at the beginning of the tunnel. The focussing portion of the element served to turn faster moving air from the higher radius area of the fan inward toward the central axis of the tunnel. In this manner, the velocity profile in the test section was such that air along the central axis of the tunnel was moving slightly faster than that toward the walls of the tunnel.

It is of interest to present a qualitative comparison of the tunnel used in this work relative to that used in the parent. Recall that the tunnel in the parent was only 0.6 meter in diameter but was also 2.4 meters in length. Too, the industrial fan in the parent had half the diameter of the blower used here. Although, a nominally appropriate velocity profile was ultimately obtained with the larger tunnel and blower in this work, it was not quite as smooth and regular as that with the smaller tunnel and fan in the parent.

Once again, as in the parent, primary measurements of air velocity were made with a Dwyer Instruments series 166 Pitot tube 12 inches in length coupled to a series 102-AV air velocity manometer which read either 0–2 inches of water pressure or 400–5,500 feet per minute in air velocity.

Secondary measurements of air velocity and of converted power were again made a first-stage turbine 107 having standard impulse blades 108 with radial lengths 18 of 4.0 centimeters and a pitch angle 3.5 degrees. Turbine 107 served as the first-stage power conversion means in FIGS. 1A–1C. Turbine 107 was fitted to a Micro Mo Electronics series 1516T006ST DC micromotor as first-stage generator 109 which, in turn was fitted to venturi tube 101 via structural supports 960B. First-stage generator 109 had an output of 0–6 Volts DC, a velocity constant of 3018 RPM, and a maximum power of 0.27 Watt. Since the combination of turbine 107 and generator 109 was detachable from first-stage venturi tube 101 via structural supports 960B, the combination also served as a secondary anemometer for calibration purposes.

Tertiary measurements of air velocity and converted power were also made with second-stage turbine 207 having abbreviated impulse blades 208 with radial length 28 of 3.9 centimeters. These were cut from the central portions of the blades of a propeller having a 30.5 centimeter diameter and a pitch angle of seven degrees. Turbine 207 served as a second-stage power conversion means in FIGS. 1A–1C. Turbine 207 was fitted via thin connectors 210 with lengths of 12.8 centimeters to a Micro Mo Electronics series 2338S006S DC micromotor as second-stage generator 209 which, in turn, was fitted was fitted to venturi tube 201 via structural supports 960C. Second-stage generator 209 had an output of 0–6 Volts DC, a velocity constant of 1243 RPM/Volt, and a maximum power of 3.6 Watts. Since the combination of turbine 207 and generator 209 was detachable from second-stage venturi tube 201 via structural supports 960C, this combination also served as a tertiary anemometer for calibration purposes.

Tertiary measurements of air velocity and converted power were also made with third-stage turbine 307 having abbreviated impulse blades 308 with radial length 38 of 7.4 centimeters. These were also cut from the central portions of the blades of a propeller having a 30.5 centimeter diameter and a pitch angle of seven degrees. Turbine 307 served as a third-stage power conversion means in FIGS. 1A–1C. Turbine 307 was fitted via thin connectors 310 with lengths of 27.7 centimeters to a Micro Mo Electronics series 2338S006S DC micromotor as third-stage generator 309 which, in turn, was fitted to venturi tube 301 via structural supports 960D. Third-stage generator 309 had an output of 0–6 Volts DC, a velocity constant of 1243 RPM/Volt, and a maximum power of 3.6 Watts. Since the combination of turbine 307 and generator 309 was detachable from third-stage venturi tube 301 via structural supports 960D, this combination also served as a tertiary anemometer for calibration purposes.

Voltage and current measurements on the outputs of generators 109, 209, and 309 were again made with the Fluke Model 25 digital multimeter. A typical experiment involved calibration of the combination of turbine 107 and generator 109 against the Pitot tube. Next, the combinations of turbine 207 and generator 209 and of turbine 307 and generator 309 were respectively calibrated against the combination of turbine 107 and generator 109. This procedure was followed with three consecutive data runs on the selected experimental points. Each data run, in turn involved the collection of ten consecutive data points spaced at 15 second intervals. The final results were represented as averages and standard deviations of the 30 data points for each experimental point.

As emphasized in the following subsection, the ratio of the power captured to the power available in the sweep of the respective turbines was always very low being a maximum of about three percent herein. Under these circumstances the velocity measurements thereto can be construed as having been conducted under very low approaching zero load conditions. Hence, the turbines acted as anemometers measuring the velocity behavior of the respective devices. That the load from the turbine-generator combinations did not interfere with the velocity measurements on the apparatus has been confirmed after the fact by reproducing selected velocity data reported in the parent directly with the Pitot tube and manometer combination.

RESULTS SUB-SECTION. Accordingly, data summarized in FIGS. 1D–1E for superventuri power source 900 of FIGS. 1A–1C demonstrate changes in throat velocity and experimental power as stages were successively added.

For these experiments venturi tube 101 had a contraction ratio of 4:1, and as illustrated to the left in FIG. 4A of the parent, angle of inlet 111 was angle 14 of inlet 111 was 45 degrees, angle 16 of outlet 113 was 7.5 degrees, length 15 of throat 112 was 2.54 centimeters, minimal diameter 12 of throat 112 was 10.2 centimeters, and maximal diameter 13 for outlet 113 was 20.3 centimeters.

Venturi tube 201 had a contraction ratio of 2.14:1, and as illustrated to the right in FIG. 4A of the parent, angle 24 of inlet 211 was 45 degrees, angle 26 of outlet 213 was 15 degrees, length 25 of throat 212 was 7.62 centimeters, minimal diameter 22 of throat 212 was 31.0 centimeters, and maximal diameter 23 for outlet 213 was 45.4 centimeters.

Venturi tube 301 had a contraction ratio of 2.04:1, and as illustrated in FIG. 2 herein, angle 34 of inlet 311 was 45 degrees, angle 36 of outlet 313 was 15 degrees, length 35 of throat 312 was 7.62 centimeters, minimal diameter 32 of throat 312 was 65.3 centimeters, and maximal diameter 33 for outlet 313 was 93.1 centimeters.

In FIG. 1D the series of four bars to the left in the diagram represent the comparative behavior in the test section of the wind tunnel from left bar to right bar, respectively, of: (i) the wind velocity as determined with first-stage turbine 107 with standard impulse blade 108 and first-stage generator 109 as anemometer; (ii) the throat velocity of first-stage venturi power source 100 when taken alone separated from superventuri power source 900; (iii) the throat velocity of first-stage venturi power source 100 when it was coupled to second-stage venturi power source 200; and (iv) the throat velocity of first-stage venturi power source 100 when it was coupled to second-stage venturi power source 200 which, in turn, was coupled to third-stage venturi power source 300.

In FIG. 1D the triumvirate of bars in the middle of the diagram represent the comparative behavior in the test section of the wind tunnel from left bar to right bar, respectively, of: (i) the wind velocity as determined with second-stage turbine 207 with abbreviated impulse blade 208 and generator 209 as anemometer; (ii) the throat velocity of second-stage venturi power source 200 when taken alone separated from the remainder of superventuri power source 900; and (iii) the throat velocity of second-stage venturi power source 200 when coupled to both first-stage venturi power source 100 and third-stage venturi power source 300.

In FIG. 1D the triumvirate of bars to the right in the diagram represent the comparative behavior in the test section of the wind tunnel from left bar to right bar, respectively, of: (i) the wind velocity as determined with third-stage turbine 307 with abbreviated impulse blade 308 and generator 309 as anemometer; (ii) the throat velocity of third-stage venturi power source 300 when taken alone separated from the remainder of superventuri power source 900; and (iii) the throat velocity of third-stage venturi power source 300 when it was coupled to second-stage venturi power source 200 which in turn was coupled to first-stage venturi power source 100.

A comparison of the anemometer velocities illustrated, respectively, in the left bar of each group of bars in FIG. 1D, suggests that the velocity distribution in the test section was reasonable, if not quite ideal. For example, the velocity represented by the left bar in the middle group is about five percent lower than that represented by the left bar in the group to the far left. However, the velocity represented by the left bar in the group to the far right is within experimental error identical to that represented by the left bar in the middle group. Since each of these velocities was measured with the radial center of the respective anemometer positioned at the radial center of the test section of the tunnel, and since the segment of area sampled by respective anemometers from left to right in the diagram had progressively longer radial arms, a slightly more ideal distribution, would have had a progressively decreasing distribution for anemometers from left to right in the diagram. Presumably, this minor flaw can be attributed to the air distribution from the fan and egg crate element and not to the anemometer measurements.

More importantly, the results in FIG. 1D generally confirm a definite progression of velocity enhancement for any given stage as a function of the number of stages pumping on that stage. For example, in the four bars to the left in the diagram, the velocity increases are clearly in steps from anemometer alone, to first-stage power source 100 alone, to first-stage power source 100 pumped by second-stage power source 200, and to first-stage power source 100 serially pumped by second-stage power source 200 and third-stage power source 300.

The only minor surprise in the work is with the results in the triumvirate of bars to the right in FIG. 1D relating to the transition from venturi power source 300 alone in the middle bar to venturi power source 300 as a pump in the right bar which was reproducible.

The results in the second bars from the left in each of the groups in FIG. 1D can be used to calculate the efficiency factors for venturi power sources 100, 200, and 300 when they were separated from each other. Then, these efficiency factors can be appropriately substituted into EQN. 7B and EQN. 7A, respectively, to arrive at predicted velocities for: (i) the throat of first-stage venturi power source 100 when it was coupled to second-stage venturi power source 200 which, in turn, was coupled to third-stage venturi power source 300; and (ii) the throat of second-stage venturi power source 200 when it was coupled to third-stage venturi power source 300. These semi-empirical velocities can then be compared with experimental velocities in the respective right bars of the groups to the far left and middle of FIG. 1D.

When this exercise was conducted, semi-empirical values of 15.5 and 9.32 meters per second were obtained for venturi power sources 100 and 200, respectively. These values may be compared to the respective experimental values of 11.9 and 8.17 illustrated in the right bars of the groups to far left and middle of FIG. 1D. Thus, the experimental values yielded about 77 and 88 percent, respectively, of the predicted semi-empirical values.

As in the parent, the most likely candidate for explaining the experimental shortfalls seems to be increased drag in venturi power sources 100 and 200. The semi-empirical values for efficiency factors were obtained when power sources 100, 200, and 300 were separated, and therefore the efficiency factors for first- and second-stage venturi power sources 100 and 200 were calculated for lower velocities than when they were coupled with third-stage venturi power source 300 to form super-venturi power source 900 in FIGS. 1A–1C. The fact that drag increases with the cube of velocity also tends to support the respective magnitudes of the experimental shortfalls. That is, first-stage venturi power source 100 had a diminished experimental performance relative to venturi power source 200 because its throat velocity in superventuri power source 900 was greater thereby causing more drag. Nonetheless, agreement, in the 77–88 percent range tends to lend confidence to the general multiplicative approach taken in EQN. 7B.

The results in FIG. 1D can also be used to calculate the power amplification factor for the superventuri power source 900 of FIGS. 1A–1C using an extended form of EQN. 8 of the parent.

$$F_p = \frac{A_{12}u_{12}^3 + (A_{22} - A_{13})u_{22}^3 + (A_{32} - A_{23})u_{32}^3}{A_{31}u^3} \quad \text{(EQN. 8A)}$$

The subscripts in EQN. 8A follow the previous convention of association with respective diameters in FIG. 4A of the parent and FIG. 2 herein. From left to right the expressions in the numerator of EQN. 8A reflect the respective contributions to the power amplification factor of first-stage venturi power source 100, second-stage venturi power source 200, and third-stage venturi power source 300. Again, the latter two expressions take into account that, in the configuration of FIGS. 1A–1C, power available in second-stage venturi tube 201 tends to be concentrated between exit 106 of first-stage venturi tube 101 and throat 212 of second-stage tube 201 while power available in third-stage venturi tube 301 tends to be concentrated between exit 206 of second-stage venturi tube 201 and throat 312 of third-stage venturi tube 301.

Once again, assuming constant density, terms in EQN. 8A include: the power amplification factor, $F_p$, in dimensionless units; the minimal throat and maximal outlet normal cross-sectional areas, $A_{12}$ and $A_{13}$, respectively, of first-stage venturi tube 101 in square meters; the minimal throat and maximal outlet normal cross-sectional areas, $A_{22}$ and $A_{23}$, respectively, of second-stage venturi tube 201 in square meters; the minimal throat and maximal inlet normal cross-sectional areas, $A_{32}$ and $A_{31}$, respectively, of third-stage venturi tube 301 in square meters; the throat velocities, $u_{12}$, $u_{22}$, and $u_{32}$, respectively, of first-, second-, and third-stage venturi power sources 100, 200, and 300 in meters per second; and the and the area weighted inlet velocity, u, for first-, second-, and third-stage venturi tubes 101, 201, and 301, respectively, in meters per second.

It is noted that in the parent, the inlet velocity, u, was designated as the velocity of flow at the inlet for a second-stage venturi tube 201 in a two-stage system while here it is designated as an area weighted velocity including all of the inlets of a three-stage system. This is a very minor distinction since the inlet area of the final stage in either case is large relative to that of any other stage. In the present case, for example, the distinction rests between an inlet velocity of the final stage of 4.49 meters per second and an area weighted velocity of 4.50 meters per second. In general, however, the latter is preferred because it is an average of the velocity distribution across the tunnel.

Substitution of other values into EQN. 8A including appropriate throat velocities represented by the right bars of each of the groups in FIG. 1D yields a power amplification factor for the superventuri power source 900 of FIGS. 1A–1C of 1.97. This result does tend to support the contention in the parent that additional stages can lead to higher power amplification factors. Recall, that the highest power amplification factor reported in the parent was 1.87 for a two-stage system identical to the first two stages of the present three stage superventuri power source 900.

It is also of interest to look at the component by component contribution of the superventuri power source of FIGS. 1A–1C to the power amplification factor of EQN. 8A. First-stage venturi power source 100 intercepted about four percent of the incoming flow, but contributed about 11 percent to the value of 1.97 for the power amplification factor. Second-stage venturi power source 200 intercepted about 19 percent of the incoming flow and contributed about that percentage to the factor. Third-stage venturi power source 300 intercepted 77 percent of the flow but contributed only 70 percent to the power amplification factor.

This data, of course, supports the contention that in a superventuri power source 900, there is a substantial buildup of power density adjacent the central superaxis 903 at the throat 112 of the first-stage venturi power source 100. This buildup is, of course, the result of pumping on venturi power source 100 by accelerated flow farther from central superaxis 903 at the throats 212 and 312, respectively, of venturi power sources 200 and 300. This situation, where in a super-venturi power source 900 the power density decreases from inside to outside, is in contrast with a conventional unenshrouded turbine where the power density is constant on an areal basis.

Once again, the data represented in the bar graph of FIG. 1E is analogous to that in FIG. 1D except that, rather than the calibrated velocities of FIG. 1D, values for uncalibrated and absolute power as determined from first-stage generator 109, second-stage generator 209, and third-stage generator 309 are presented. Comparison of FIGS. 1D and 1E also reveals that the data in the latter exhibits much stronger, exponential increases as expected from EQN. 1 in the parent where available power is seen to proportional to the cube of velocity.

Further analysis of the data in the two figures in the form of a direct comparison of the experimental power captured in the throats of venturi power sources 100, 200, and 300 in FIG. 1E with the power available thereto from the velocity data of FIG. 1E and EQN. 1 of the parent suggests again that the capture efficiency was low. For the case of first-stage turbine 107 with standard impulse blades 108 and first-stage generator 109, the captured fraction was 0.029–0.014. For second-stage turbine 207 with abbreviated impulse blades 208 and second-stage generator 209, the captured fraction was 0.0040–0.024. For third-stage turbine 307 with abbreviated impulse blades 308 and generator 309 the captured fraction was still less at 0.00042–0.00029. Furthermore, in each case the captured fraction of power tended to decrease as available power increased.

DISCUSSION SUB-SECTION As indicated earlier, FIG. 3 illustrates a superventuri power source 900 having four stages with the final stage devoted exclusively to pumping which resolves the Betz-Venturi conflict in the outlet of the final stage. Other important design features for this system may be found in Table I below. These include the outlet angles and the contraction ratios, $C_i$ as previously defined. In Table I the outlet angle increases and the contraction ratio decreases with increasing stage number.

In FIG. 4E of the parent it was shown that velocity for a venturi tube of the type shown in FIG. 4B increased as its outlet angle decreased. By inference, then, the efficiency of a venturi tube also increases as its outlet angle decreases. Thus longer, lower angle diffusers enhance efficiency by allowing more time in the diffuser for pressure re-equilibration from some minimal value at the throat to some maximal value at the exit of the venturi tube.

In FIG. 4C of the parent it was shown that efficiency for a venturi tube decreased as its contraction ratio increased at a fixed diffuser angle of 15 degrees. Thus, higher contraction ratios tend to decrease the efficiency of a venturi tube of fixed diffuser angle by imposing a larger pressure gradient between the throat and the exit of the venturi tube.

It can be concluded, therefore, that a higher contraction ratio should be matched with a lower outlet angle in a venturi tube. Conversely, a lower contraction ratio should be matched with a higher outlet angle in a venturi tube.

Furthermore, it was desirable to blend these two results into a superventuri power source 900 of FIG. 3 herein which was both as efficient in performance as possible and simultaneously as compact as feasible in terms of its ratio of total length to maximal width. The result is a system with a ratio of total length to maximal width of approximately 2.1:1.

Accordingly, in FIG. 3 and Table I, first-stage venturi tube 101 has the highest contraction ratio and lowest outlet angle of any of the tubes. The lower efficiency from the highest contraction ratio tends to be partially offset by the higher efficiency of the lowest outlet angle. However, the lower efficiency due to high contraction ratio is mostly offset by the upper stages which make either a direct or indirect contribution to the pumping of first-stage venturi tube 101. Since the diameter of venturi tube 101 is least among the venturi tubes, and even though its contraction ratio is highest, the contribution to total length from its lowest diffuser angle is thereby rendered relatively minimal.

Conversely venturi tube 401 has the lowest contraction ratio and highest outlet angle of any of the tubes. The higher efficiency from the lowest contraction ratio means that this tube by itself without pumping will be highly efficient. Since the diameter of venturi tube 401 is greatest among the venturi tubes, the contribution to total length is held relatively minimal by its low contraction ratio and high outlet angle.

To arrive at some useful predictions for this system, it will prove helpful to move toward a more general empirical statement of its continuity.

EQN. 7C is a generalized version for the behavior of the $$u_{i2} = \left( \prod_{i=n}^{N} k_{it} k_{id} C_i \right) u \qquad \text{(EQN. 7C)}$$

throat velocity $u_{i2}$ in meters per second of the $i^{th}$ stage of a superventuri apparatus. EQN. 7C is seen to follow from EQN. 7B and EQN. 7A herein which described the behaviors of the throat velocities of the first- and second-stage venturi tubes, respectively, in the superventuri apparatus illustrated in FIGS. 1A–1C also herein. Other terms for EQN. 7C include: the ambient velocity, u, of the selected medium in meters per second; the contraction ratio, $C_i$, of the $i^{th}$ stage in dimensionless units; and the efficiency factors $k_{it}$ and $k_{id}$ of the $i^{th}$ stage with each of these also in dimensionless units. The product is taken from the stage number, n, of the venturi tube whose throat velocity, $u_{n2}$, is desired to the stage number, N, of the last stage of the superventuri apparatus.

The first efficiency factor, $k_{it}$, in EQN. 7C is identical in meaning to the tube efficiency factors $k_1$, $k_2$, and $k_3$ in EQN. 7B. That is, $k_{ie}$ is the inherent tube efficiency factor of the $i^{th}$-stage venturi tube. Of course, it is dependent upon contraction ratio and diffuser angle.

The second efficiency factor, $k_{id}$, is a coupling efficiency factor which relates, at least in part, to increased drag as a result of the elevated throat velocities of a selected medium in a lower stage of an assembled superventuri apparatus being pumped upon by the remaining upper stages. For example, it was seen in the results sub-section that the experimental values of throat velocities for first- and second-stage venturi power sources 100 and 200 were 77 and 88 percent, respectively, of the theoretical values predicted using EQN. 7B and EQN. 7A. Accordingly, for superventuri apparatus 901 of FIGS. 1A–1C herein $k_{1d} \approx 0.9$, $k_{2d} \approx 0.9$, and $k_{3d} \approx 1$ as a first order approximation under the conditions of the experiment.

It is important to note that the compound coupling efficiency factor for first-stage venturi power source 100 in FIGS. 1A–1C herein would be in the formulation of EQN. 7C, the product of $k_{1d}$, $k_{2d}$, and $k_{3d}$. Accordingly, this product becomes 0.81 which is a first-order approximation of 0.77 represented above as a percentage for venturi power source 100 in FIGS. 1A–1C herein. The nature of the coupling efficiency factor as a compound entity was selected for its convenience rather than for any theoretical reason.

It is of interest to note the potential for interplay between the efficiency factor $k_{id}$ and the withdrawal of power by turbines. As maximum power is withdrawn from a venturi power source by turbines, respective throat velocities will decrease. However, under the circumstance of lesser throat velocities, then the respective values for $k_{id}$ should tend to increase because of less drag in the superventuri apparatus at lower throat velocities. In other words, the highest possible power output from a superventuri power source should tend to further promote efficiency of operation via reduced drag at lower throat velocities.

This interplay between the efficiency factor for coupling and power withdrawal by turbines is the primary justification for having turbines 207 and 307 in FIG. 3. If power were not removed by these turbines, the velocity at throat 112 of first-stage venturi tube 101 would become large enough that it would substantially reduce the coupling efficiency factor for the lowest stage.

The term, pump area, in Table I is an abbreviation for the term, normal pumping cross-sectional area of the beta-venturi tube, which was introduced in the parent. That term was defined as the difference between the maximal normal cross-sectional area of the inlet of the beta-venturi tube and the maximal normal

TABLE I

Some parameters for FIG. 3 and EQN. 7C.

| Stage | Outlet angle (deg) | Pump area (Rel) | $c_i$ | $k_{it}$ | $k_{id}$ | $u_{i2}$ (Rel) |
|---|---|---|---|---|---|---|
| 1 | 5.0 |  | 5.0 | 0.39 | 0.9 | 4.3 |
| 2 | 7.5 | 7.4 | 3.0 | 0.53 | 0.9 | 2.4 |
| 3 | 10.0 | 2.4 | 2.0 | 0.73 | 0.9 | 1.7 |
| 4 | 12.5 | 1.2 | 1.5 | 0.86 | 1.0 | 1.3 | cross-sectional area of the inlet of the alpha-venturi tube. The data in this column are presented relative to a maximal normal cross-sectional areas of the respective alpha-venturi tube being unity. These values were selected in part to open up the area between the exit of an alpha-venturi tube and the throat of a respective beta-venturi tube for the pairs in the lower stages.

The contraction ratios in the fourth column of Table I were selected to promote efficiency as discussed previously.

The efficiency factors in the fifth through seventh columns of Table I are based upon available experimental data. The tube efficiency factors in the fifth column are values from the curve in FIG. 4C of the parent corrected for angle of outlet from the curve in FIG. 4E of that work. Recall that the data for contraction ratios in FIG. 4C of the parent were taken on venturi tubes each having an angle of outlet of 15 degrees. Hence, the velocity for this angle in FIG. 4E of the parent was given a correction factor of 1.00. Correction factors for the outlet angles of 5, 7.5, 10, and 12.5 degrees were then 1.26, 1.17, 1.09, and 1.05, respectively.

As indicated above, the coupling efficiency factors in the sixth column of Table I represent an approximation of experience with superventuri apparatuses to date. In reference to these values and their consequence, it is noted that they represent a significant extrapolation of scant experimental data. Accordingly, their validity, as well as the formulation of the coupling efficiency factor in EQN. 7C, remain open to question.

The throat velocities in the seventh column of Table I are presented relative to an ambient or entrance velocity of a selected medium which has a value of unity. However, these will be most meaningful for an ambient wind in the range of 4.4–4.7 meters per second in the range where past experiments have been performed.

The maximum predicted throat velocity of 4.3-times ambient velocity in Table I for first-stage venturi power source 100 in FIG. 3 is clearly a step beyond the corresponding value of 2.53-times ambient velocity for the system illustrated in FIGS. 1A–1C herein.

These velocity data also yield a power amplification factor of 1.6 for the system of FIG. 3 compared to the experimental value of 2.0 for the system of FIGS. 1A–1C herein. On a component basis, first-stage power source 100 in FIG. 3 makes a contribution of 16 percent to the power amplification factor, while its throat comprises only 0.32 percent of the total normal cross-sectional area of superventuri power source 100. Hence, as discussed previously, the lower stages should make a disproportionably large contribution to any macroscopic upper limit of extraction. However, the values for velocities and power amplification factor are extremely sensitive to marginal changes in efficiency factors so that reasonable caution regarding the reliability of the results in Table I and the predicted power amplification factor is prudent.

It follows from the preceding discussion that an emphasis on enhancing tube and coupling efficiency factors as far as possible should be of central interest in the future development of the technology. Toward this end, the prior research on aerogenerator shrouds of Igra in Israel seems especially on target since the thrust of the work involved having venturi tubes of low drag via their aerodynamic cross-sections. The tubes also had bell-shaped inputs to provide velocity distributions of about one percent at the throats of the venturi tubes.

SCOPE, RAMIFICATIONS, AND CONCLUSIONS

Thus it will be recognized that the present invention relates to enhanced power recovery from the flow of a selected medium with a superventuri power source. Depending in part upon the application, the invention may take many sizes, shapes, and forms. Accordingly, while my above description contains many specificities, these should not be construed as limitations on the scope of the invention, but rather as exemplifications of preferred embodiments thereof. Many other variations are possible.

For example, in the experimental work presented herein the selected medium was composed substantially of air in a wind. Other possibilities mentioned include a superventuri power source whereby the selected medium is composed substantially of steam, or of carbon dioxide gas and water vapor as products of combustion, or of a stream of liquid water. Thus, the limit on the selected medium is broad covering the range of materials whereby flow through a superventuri power source may be achieved. It is also worthwhile pointing out that many applications with extant air, gas, or water turbines would presumably benefit in efficiency by refitting with superventuri power sources.

Of course there may be differing requirements as to the absolute smallest size and capacity of the lowest stage of the superventuri power source depending upon the selected medium. One would anticipate, for example, that if the selected medium was a stream of liquid water, the first-stage venturi tube might well have a lesser diameter and capacity than if the selected medium was air in a wind. Upper stages could then be sized accordingly. As well, this line of thought might be extended to cover differing materials and details of construction as required for turbines employed with various selected media. That is, while air and water turbines might possess many similarities, in detail they may be quite distinguishable from one another.

In another related example, the turbines shown in the drawing are all of the impulse type. With this kind of turbine adjacent the throat of a venturi tube where the selected medium has a relatively low pressure and high velocity, the blade or blades of the turning rotor may tend to reduce the velocity of the selected medium converting flow velocity, force, kinetic energy, and power to mechanical velocity, force, kinetic energy, and power of the turning rotor, respectively.

On the other hand, except where specified otherwise in the appended claims, the turbines shown in the drawing might have been of the reaction type combination of the impulse and reaction types as discussed in the parent. In general, therefore, a turbine is a device for producing rotary mechanical power from the flow of a selected medium. Similarly, each turbine need not be attached directly to a generator.

Instead, there might be one or more transmissions interconnecting various turbines to one generator as illustrated in FIG. 6 of the parent. Too, a water pump, compressor, hydrogen gas generator, or the like might be substituted for a generator in every case.

As suggested in the parent, a superventuri power source might be stationary or moving, it might be a large-scale power recovery means, a small-scale sensitive instrument, or a propulsion means. It might heavier than air and mounted at ground level or on a pole, or it might be lighter than air and tethered to the ground with a cable.

Once again, except as specified in the appended claims the detailed external and internal characteristics including materials of construction of the substantially hollow conduits housing venturi tubes are not limiting to the invention disclosed herein. Hence, singly or in combination, the external and internal shapes of venturi tubes included in a superventuri apparatus may be irregular, or they may be common and regular such as round, oval, square, rectangular, hexagonal or the like. Too, singly or in combination, the exterior and interior unions may or may not be smooth and rounded. In like manner, the dimensional characteristics of venturi tubes, except as specified in the appended claims, are open so that parameters such as cross-sectional areas for entrances and exits may show considerable variation. Specifically, the maximal cross-sectional areas for the inlet and outlet of any given venturi tube need not be identical as represented in the drawing sheets herein. Also a throat of generally minimal normal cross-sectional area may have either zero or nonzero length. So too, turbines may fitted as illustrated in the drawing, or they may be combined with other another component such an outlet of a venturi tube forming the next lower stage.

While the accompanying drawings illustrate superventuri power sources having only either three or four venturi tubes, and while the appended claims refer to superventuri power sources having a series of at least two or three venturi tubes, these facts should not be construed to imply that the best manifestations of the current invention may involve only two to four venturi tubes. Indeed, the optimal number of venturi tubes for a superventuri power source under a given set of circumstances can be determined through conventional experimentation and judicious selection.

Within the limits of the appended claims, the phrase, power source, should be interpreted broadly. On a smaller size scale, the invention might provide rotary mechanical rotary power to drive one or more generators on an anemometer or other type of flowmeter with enhanced range and thereby sensitivity. On an intermediate size scale, the invention might provide enough rotary mechanical power to drive one or more generators or water pumps sufficient for the purposes of a farm family. On a larger size scale, the invention might provide enough rotary mechanical power to drive one or more generators to provide electricity sufficient for the purposes of a community of people.

Regarding the theory and equations herein and in the parent, the invention is not bound by these pathways. More specifically, EQN. 7C is offered to promote discourse on possible refinements as to the detailed dynamics of the invention. Too, in reference to power amplification, there may be alternatives to EQN 8A. Finally, the data in FIGS. 1D–1E are offered as representative results under given sets of circumstances. Better experiments under more carefully controlled conditions may yield superior data.

Lastly, especially under circumstances where a nonreactive selected medium such as air or water is employed, the technology described may be viewed as already relatively benign in the environment. However, superventuri power source 900 in FIGS. 1A–1C and FIG. 3, might be made even more benign if inlets and outlets were screened to protect birds, fish or the like from the turbines. Too, superventuri power source might be protected from high winds or high flows generally if the inlets were capable of being shield with shaped covers or the if the power source were capable of being turned 90 degrees horizontal or vertical to the flow.

Accordingly, the scope of the invention should be determined not by the embodiments, theory, and data presented, but the appended claims and their legal equivalents.

What is claimed is:

1. A superventuri power source comprising:
   a. a series of at least two venturi tubes whereof each of the venturi tubes includes a central axis through a substantially hollow conduit having a venturi constriction; and wherein the venturi constriction includes an inlet of nonzero length and generally decreasing normal cross-sectional area which leads to a throat of generally minimal normal cross-sectional area which, in turn, leads to an outlet of nonzero length and generally increasing normal cross-sectional area; and whereby each normal cross-sectional area is perpendicular to its respective central axis;
   b. a superventuri apparatus including: (i) at least one twosome in the series of at least two venturi tubes labeled an alpha- and a beta-venturi tube, respectively, and of predetermined successively increasing flow capacity, respectively; (ii) the substantially hollow conduit of the alpha-venturi tube having an open entrance and an open exit adjacent its inlet and outlet, respectively, to permit flow of a selected medium through the open entrance into the venturi constriction and out of the open exit; (iii) the respective inlets of the twosome each facing the intended direction of flow of the selected medium; (iv) the minimal normal cross-sectional area of the throat of the beta-venturi tube being greater than the maximal normal cross-sectional area of the open exit of the alpha-venturi tube with the open exit of the alpha-venturi tube being placed adjacent the throat of the beta-venturi tube in a manner that the respective central axes of the twosome essentially merge into a central super-axis along an intended line of flow of the selected medium; and (v) as referenced from the super-axis, the inlets of the alpha- and beta-venturi tubes being positioned to intercept relatively inner and outer portions of the selected medium as an alpha- and a beta-flow, respectively, whereby in operation the alpha-flow as exhaust from the open exit of the alpha-venturi tube joins the accelerated beta-flow adjacent the throat of the beta-venturi tube causing a pumping action by the beta-venturi tube on the alpha-venturi tube; and
   c. a beta-turbine adjacent the throat of the beta-venturi tube to recover useful rotary mechanical power from flow power of the selected medium.

2. The superventuri power source of claim 1 whereby the selected medium is composed substantially of air in a wind.

3. The superventuri power source of claim 1 whereby the selected medium is composed substantially of a stream of liquid water.

4. The superventuri power source of claim 1 whereby the selected medium is composed substantially of steam.

5. The superventuri power source of claim 1 whereby the selected medium is composed substantially of carbon dioxide gas and water vapor as products of combustion.

6. A superventuri power source comprising:

a. a series of at least three venturi tubes whereof each of the venturi tubes includes a central axis through a substantially hollow conduit having a venturi constriction; and wherein the venturi constriction includes an inlet of nonzero length and generally decreasing normal cross-sectional area which leads to a throat of generally minimal normal cross-sectional area which, in turn, leads to an outlet of nonzero length and generally increasing normal cross-sectional area; and whereby each normal cross-sectional area is perpendicular to its respective central axis;

b. a superventuri apparatus including: (i) at least one threesome in the series of at least three venturi tubes labeled an alpha-, a beta-, and a gamma-venturi tube, respectively, and of predetermined successively increasing flow capacity, respectively; (ii) the substantially hollow conduits of the alpha- and beta-venturi tubes each having an open entrance and an open exit adjacent the respective inlet and outlet to permit flow of a selected medium through the respective open entrance into the respective venturi constriction and out of the respective open exit; (iii) the respective inlets of the threesome each facing the intended direction of flow of the selected medium; (iv) the open exit of the alpha-venturi tube being placed adjacent the throat of the beta-venturi tube and the open exit of the beta-venturi tube being placed adjacent the throat of the gamma-venturi tube in a manner that the respective central axes of the threesome essentially merge into a central super-axis along an intended line of flow of the selected medium; and (v) as referenced from the super-axis, the inlets of the alpha-, beta-, and gamma-venturi tubes being positioned to intercept relatively inner, intermediate, and outer portions of the selected medium as an alpha-, a beta-, and a gamma-flow respectively, whereby in operation the alpha-flow as exhaust from the open exit of the alpha-venturi tube joins accelerated beta-flow adjacent the throat of the beta-venturi tube and the beta-flow as exhaust from the open exit of the beta-venturi-tube, in turn, joins accelerated gamma-flow adjacent the throat of the gamma-venturi tube causing pumping actions by the beta-venturi tube on the alpha-venturi tube and by the gamma-venturi tube on the beta-venturi tube, respectively; and c. a beta-turbine adjacent the throat of the beta-venturi tube to recover useful rotary mechanical power from flow power of the selected medium while the beta-venturi tube pumps on the alpha-venturi tube and is pumped on by the gamma-venturi tube wherein a gamma-turbine is absent adjacent the throat of the gamma-venturi tube to prevent a Betz-Venturi conflict in the outlet of the gamma-venturi tube.

7. The superventuri power source of claim 6 whereby the normal pumping cross-sectional area of the beta-venturi tube, which is defined as the difference between the maximal normal cross-sectional area of the inlet of the beta-venturi tube and the maximal normal cross-sectional area of the inlet of the alpha-venturi tube, is at least as great as the maximal normal cross-sectional area of the inlet of the alpha-venturi tube, and whereby the corresponding normal pumping cross-sectional area of the gamma-venturi tube relative to the beta-venturi tube, is at least as great as the maximal normal cross-sectional area of the inlet of the beta-venturi tube.

8. The superventuri power source of claim 6 whereby the maximal contraction ratio of the alpha-venturi tube, defined as the ratio between the maximal normal cross-sectional area of the inlet and the minimal normal cross-sectional area of the throat of the alpha-venturi tube, is greater than the respective maximal contraction ratio of the beta-venturi tube, and whereby the respective maximal contraction ratio of the beta-venturi tube is, in turn, greater than the respective maximal contraction ratio of the gamma-venturi tube.

9. The superventuri power source of claim 6 whereby the angle of the outlet of the alpha-venturi tube is less than the angle of the outlet of the beta-venturi tube, and whereby the angle of the outlet of the beta-venturi tube is, in turn, less than the angle of the outlet of the gamma-venturi tube.

10. The superventuri power source of claim 6 wherein for each of the alpha-, beta-, and gamma-venturi tubes the length of the respective outlet is greater than the length of the respective inlet.

11. The superventuri power source of claim 6 which also includes an alpha-turbine adjacent the throat of the alpha-venturi tube to recover yet more useful rotary mechanical power from flow power of the selected medium.

12. The superventuri power source of claim 6 wherein:

a. the alpha- and beta-venturi tubes of the threesome are annular and positioned concentrically along the central super-axis which is linear;

b. the minimal diameter for the throat of the beta-venturi tube is greater than the maximal diameter for the open exit of the alpha-venturi tube;

c. the beta-turbine includes at least one abbreviated impulse blade comprising a top and a bottom with radial length between the top and the bottom approximating half the difference between the minimal diameter for the throat of the beta-venturi tube and the maximal diameter for the open exit of the alpha-venturi tube; and d. the rotation radii for the top and the bottom of the abbreviated impulse blade normal to the central super-axis are approximately half the minimal diameter for the throat of the beta-venturi tube and half the maximal diameter for the open exit of the alpha-venturi tube, respectively.

* * * * *